(12) United States Patent
Weber et al.

(10) Patent No.: US 9,313,266 B2
(45) Date of Patent: Apr. 12, 2016

(54) DYNAMIC ASSIGNMENT OF TRANSFERS OF BLOCKS OF DATA

(71) Applicant: SAS Institute Inc., Cary, NC (US)

(72) Inventors: Tom Weber, Raleigh, NC (US); Paul Kent, Apex, NC (US)

(73) Assignee: SAS INSTITUTE, INC., Cary, NC (US)

( * ) Notice: Subject to any disclaimer, the term of this patent is extended or adjusted under 35 U.S.C. 154(b) by 0 days.

(21) Appl. No.: 14/572,446

(22) Filed: Dec. 16, 2014

(65) Prior Publication Data

US 2016/0044092 A1 Feb. 11, 2016

Related U.S. Application Data

(60) Provisional application No. 62/035,254, filed on Aug. 8, 2014.

(51) Int. Cl.
*G06F 15/16* (2006.01)
*H04L 29/08* (2006.01)
*G06F 12/00* (2006.01)

(52) U.S. Cl.
CPC .......... *H04L 67/10* (2013.01); *H04L 29/08072* (2013.01); *H04L 67/32* (2013.01)

(58) Field of Classification Search
USPC .......... 709/201, 203, 223–229, 250; 718/101, 718/102
See application file for complete search history.

(56) References Cited

U.S. PATENT DOCUMENTS

| | | | |
|---|---|---|---|
| 2006/0161921 A1* | 7/2006 | Kissell | 718/102 |
| 2007/0106990 A1* | 5/2007 | Kissell | 718/102 |
| 2009/0125907 A1* | 5/2009 | Wen et al. | 718/101 |
| 2010/0228954 A1* | 9/2010 | Frank et al. | 712/206 |
| 2012/0131309 A1* | 5/2012 | Johnson et al. | 712/41 |
| 2012/0131591 A1 | 5/2012 | Moorthi et al. | |
| 2012/0209901 A1 | 8/2012 | Xu et al. | |
| 2012/0278578 A1 | 11/2012 | Castillo et al. | |
| 2013/0185543 A1* | 7/2013 | Frank et al. | 712/220 |
| 2014/0188918 A1 | 7/2014 | Shamlin et al. | |

* cited by examiner

*Primary Examiner* — Zarni Maung
(74) *Attorney, Agent, or Firm* — Kacvinsky Daisak Bluni PLLC

(57) ABSTRACT

A computer-program causing a computing device to transmit a command to a data storage cluster for multiple data transfer threads thereof to request assignment of a data transfer from a distribution thread; await receipt of a request for assignment from a data transfer thread; compare the quantity data transfer threads to the quantity of computation threads of a data processing cluster; assign to the data transfer thread an exchange of a block of data with a single computation thread in response to receipt of the request and to the multitude of data transfer threads comprising a greater quantity of threads than the multitude of computation threads; and assign to the data transfer thread exchanges of multiple blocks of data with multiple computation threads in response to receipt of the request and to the multitude of data transfer threads comprising a lesser quantity of threads than the multitude of computation threads.

29 Claims, 22 Drawing Sheets

DYNAMIC ASSIGNMENT OF TRANSFERS OF BLOCKS OF DATA

CROSS-REFERENCE TO RELATED APPLICATIONS

This application claims the benefit of priority under 35 U.S.C. §119(e) to U.S. Provisional Application Ser. No. 62/035,254 entitled ASYMMETRIC PARALLEL REMOTE DATA TRANSFER DISTRIBUTOR PROTOCOL filed Aug. 8, 2014, the entirety of which is incorporated herein by reference.

BACKGROUND

The performance of analyses of large data sets (e.g., what is commonly referred to as "big data") is becoming increasingly commonplace in such as areas as simulations, process monitoring, decision making, behavioral modeling and making predictions. Working with large data sets begets the challenges of where to store and process the data contained within large data sets in a manner that is efficient.

SUMMARY

The following presents a simplified summary in order to provide a basic understanding of some novel embodiments described herein. This summary is not an extensive overview, and it is not intended to identify key/critical elements or to delineate the scope thereof. Its purpose is to present some concepts in a simplified form as a prelude to the more detailed description that is presented later.

A computer-program product tangibly embodied in a non-transitory machine-readable storage medium, the computer-program product including instructions that may be operable to cause a computing device to perform operations including transmit, from a distribution thread, a command via a network to a data storage cluster for each data transfer thread of a multitude of data transfer threads executed within the data storage cluster to request assignment of a data transfer from the distribution thread at a network address specified in the command; await receipt of a request for assignment from a data transfer thread of the multitude of data transfer threads via the network; compare a quantity of threads of the multitude of data transfer threads to a quantity of threads of a multitude of computation threads executed within a data processing cluster; assign to the data transfer thread an exchange of a block of data with a single computation thread of the multitude of computation threads in response to receipt of the request for assignment and in response to the multitude of data transfer threads comprising a greater quantity of threads than the multitude of computation threads; and assign to the data transfer thread exchanges of multiple blocks of data with multiple computation threads of the multitude of computation threads in response to receipt of the request for assignment and in response to the multitude of data transfer threads comprising a lesser quantity of threads than the multitude of computation threads, wherein the multiple blocks of data comprises the block of data.

A computer-implemented method may include transmitting, from a distribution thread, a command via a network to a data storage cluster for each data transfer thread of a multitude of data transfer threads executed within the data storage cluster to request assignment of a data transfer from the distribution thread at a network address specified in the command; awaiting receipt of a request for assignment from a data transfer thread of the multitude of data transfer threads via the network; comparing a quantity of threads of the multitude of data transfer threads to a quantity of threads of a multitude of computation threads executed within a data processing cluster; and assigning to the data transfer thread an exchange of a block of data with a single computation thread of the multitude of computation threads in response to receiving the request for assignment and in response to the multitude of data transfer threads comprising a greater quantity of threads than the multitude of computation threads, or assigning to the data transfer thread exchanges of multiple blocks of data with multiple computation threads of the multitude of computation threads in response to receiving the request for assignment and in response to the multitude of data transfer threads comprising a lesser quantity of threads than the multitude of computation threads, wherein the multiple blocks of data comprises the block of data.

An apparatus may include a processor component and a command component for execution by the processor component in a distribution thread to transmit a command via a network to a data storage cluster for each data transfer thread of a multitude of data transfer threads executed within the data storage cluster to request assignment of a data transfer from an assignment component at a network address on the network specified in the command. The assignment component may be executable by the processor component in the distribution thread to await receipt of a request for assignment from a data transfer thread of the multitude of data transfer threads via the network; compare a quantity of threads of the multitude of data transfer threads to a quantity of threads of a multitude of computation threads executed within a data processing cluster; assign to the data transfer thread an exchange of a block of data with a single computation thread of the multitude of computation threads in response to receipt of the request for assignment and in response to the multitude of data transfer threads comprising a greater quantity of threads than the multitude of computation threads; and assign to the data transfer thread exchanges of multiple blocks of data with multiple computation threads of the multitude of computation threads in response to receipt of the request for assignment and in response to the multitude of data transfer threads comprising a lesser quantity of threads than the multitude of computation threads, wherein the multiple blocks of data comprises the block of data.

A computer-program product tangibly embodied in a non-transitory machine-readable storage medium, the computer-program product including instructions that may be operable to cause a computing device to perform operations including transmit, from a data transfer thread of a multitude of data transfer threads executed within a data storage cluster and to a distribution thread at a network address on a network, a request for an assignment of an exchange of data with at least one computation thread of a multitude of computation threads executed within a data processing cluster; exchange a block of data with a single computation thread of the multitude of computation threads in response to receipt of an assignment to exchange the block of data with the single computation thread; and exchange multiple blocks of data with multiple computation threads of the multitude of computation threads in a round robin manner among the multiple computation threads in response to receipt of an assignment to exchange the multiple blocks of data with the multiple computation threads, wherein the multiple blocks of data comprises the block of data.

A computer-implemented method may include transmitting, from a data transfer thread of a multitude of data transfer threads executed within a data storage cluster and to a distribution thread at a network address on a network, a request for an assignment of an exchange of data with at least one computation thread of a multitude of computation threads executed within a data processing cluster; exchanging a block of data with a single computation thread of the multitude of computation threads in response to receipt of an assignment to exchange the block of data with the single computation thread; and exchanging multiple blocks of data with multiple computation threads of the multitude of computation threads in a round robin manner among the multiple computation threads in response to receipt of an assignment to exchange the multiple blocks of data with the multiple computation threads, wherein the multiple blocks of data comprises the block of data.

An apparatus may include a processor component of a storage device of a data storage cluster within which a multitude of data transfer threads are executed; a transfer preparation component for execution by the processor component within a data transfer thread of the multitude of data transfer threads to transmit to a distribution thread at a network address on a network a request for an assignment of an exchange of data with at least one computation thread of a multitude of computation threads executed within a data processing cluster; and a block transfer component. The block transfer component may be executable by the processor component within the data transfer thread to exchange a block of data with a single computation thread of the multitude of computation threads in response to receipt of an assignment to exchange the block of data with the single computation thread; and exchange multiple blocks of data with multiple computation threads of the multitude of computation threads in a round robin manner among the multiple computation threads in response to receipt of an assignment to exchange the multiple blocks of data with the multiple computation threads, wherein the multiple blocks of data comprises the block of data.

To the accomplishment of the foregoing and related ends, certain illustrative aspects are described herein in connection with the following description and the annexed drawings. These aspects are indicative of the various ways in which the principles disclosed herein can be practiced and all aspects and equivalents thereof are intended to be within the scope of the claimed subject matter. Other features will become apparent from the following detailed description when considered in conjunction with the drawings.

DETAILED DESCRIPTION

Figure 1:
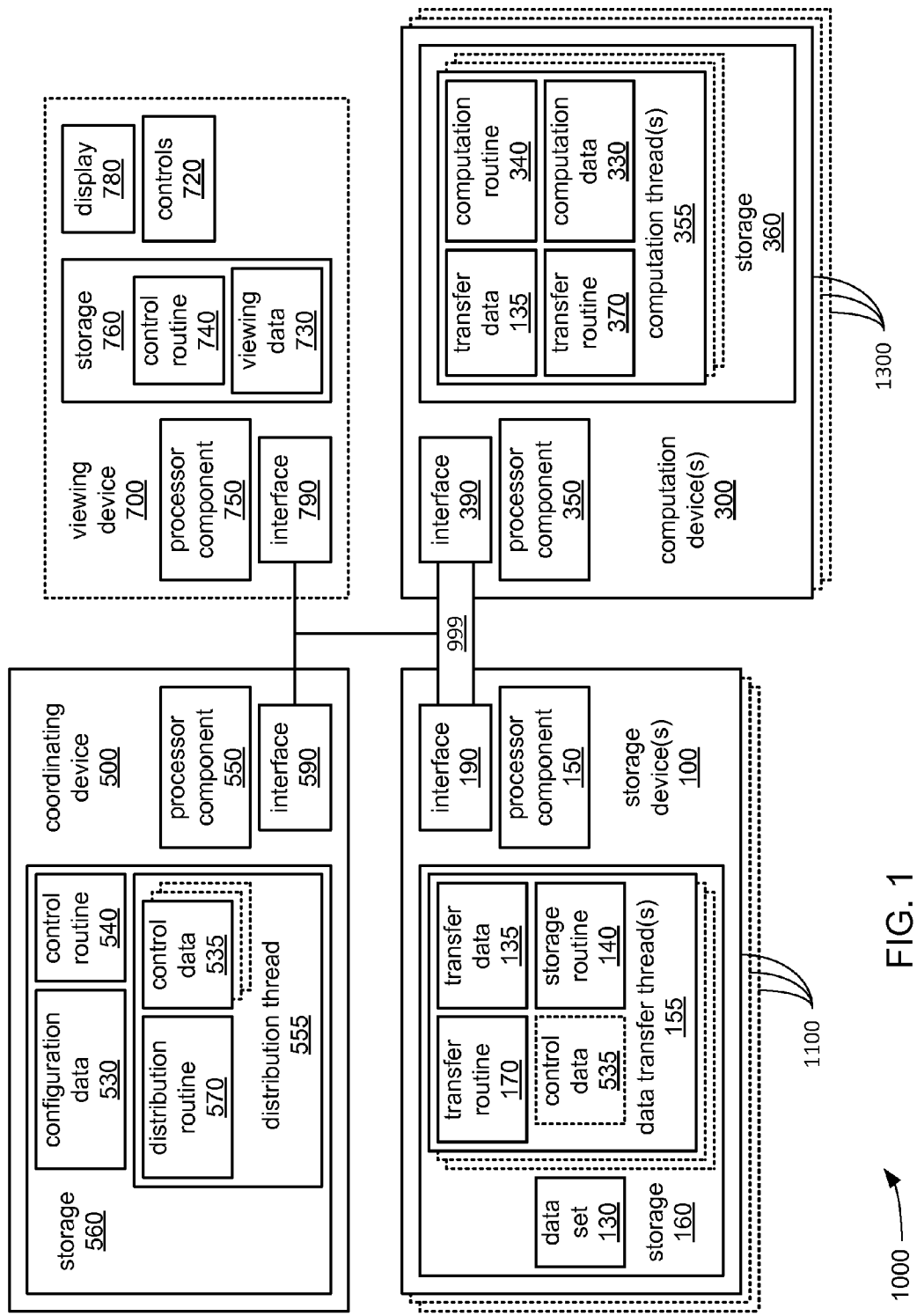
FIG. 1 illustrates an example embodiment of an analytical system.

In performing analyses of large data sets, a recurring challenge is efficiently making at least a portion of a large data set available to the arrays of computing devices at which the analyses are formed. A common approach is to use the same devices for both storage and analysis computations in an effort to avoid transferring large amounts of data through any network, at all. However, as recognizable to those skilled in the art, storage devices often employ an internal architecture that is considerably different from that of computation devices employed to perform analysis calculations. As a result, the use of one device to serve both functions often begets an undesirable tradeoff in internal architecture. Either the architecture must provide a costly superset of the features needed to perform both functions, or a less costly architecture may be used that disadvantages the performance of one, if not both, of these functions.

Another common approach is to physically co-locate storage devices on which a large data set is stored with separate computation devices that perform the analysis calculations to minimize the transfer of large amounts of data through at least lengthy networks. Although this approach avoids making tradeoffs in internal architectures for either of the storage or computation functions, this approach still entails disallowing the analysis of a large data set at a location geographically distant from where the large data set is stored.

Various embodiments described herein are generally directed to dynamically assigning transfers of blocks of data through a network extending between storage devices and computation devices using unequal and/or dynamically changing quantities of data transfer and computation threads. A command may be transmitted to one or more storage devices of a data storage cluster for multiple data transfer threads thereof to contact a distribution thread to request an assignment of one or more blocks of data to transfer between one or more of the storage devices and one or more computation devices of a data processing cluster. Each of the data transfer threads may be assigned one or more blocks of data to transfer to or from one or more of the computation threads by the distribution thread as each data transfer thread independently contacts the distribution thread through the network to request an assignment. Each of the data transfer threads may perform its assigned transfer(s) of one or more blocks of data to or from one or more of the computation threads through the network independently of the other data transfer threads. Each of the computation threads may independently provide an indication of when the blocks of data associated therewith have been transferred.

Analysis computations involving numerous blocks of data of a large data set may be performed in parallel across multiple computation threads executed by processor component(s) of one or more computation devices that may make up a data processing cluster. The large data set stored by one or more storage devices that may make up a data storage cluster and that include other processor component(s) that execute multiple data transfer threads to transfer the numerous blocks of data between the computation device(s) and the storage device(s) in support of the analysis computations.

Either a computation device of the data processing cluster or a separate coordinating device coupled to each of the data processing and data storage clusters may recurringly monitor the quantity and/or network addresses of computation threads performing computations and of data transfer threads available to transfer blocks of data. Such a computation device or coordinating device may also execute a distribution thread that makes use of the information gathered concerning quantities and/or network addresses of computation and data transfer threads to configure various aspects of the transfer of blocks of data. More specifically, in response to receiving a request for the transfer of multiple blocks of data of the large data set, the distribution thread may transmit a command to one or more storage devices for data transfer threads to contact the distribution thread to obtain assignments of transfers of blocks of data.

The request may originate from a computation device or still another device coupled to coordinating device and/or the computation device in which the distribution thread is executed. The request may specify what computation threads require a transfer of blocks of data therefrom or thereto, and/or how many blocks of data are to be so transferred for each computation thread. In embodiments in which network addresses of each of the computation threads are not already provided through the recurring monitoring of computation threads, the request may convey the network addresses of the computation threads associated with the request.

The command transmitted to one or more storage devices may include the network address at which the distribution thread may be so contacted by each of the data transfer threads on the network to obtain their assignments. In embodiments in which there is more than one storage device and at least one data transfer thread executed within each, the command may be received by one of the storage devices and relayed to one or more others. Following transmission of the command, the distribution thread may await being so contacted by each of the data transfer threads. As each data transfer thread independently contacts the distribution thread to request an assignment, the distribution thread assigns to that data transfer thread the transfer of one or more blocks of data associated with one or more computation threads selected in a round robin manner. More precisely, prior to transmitting the command and/or prior to assigning transfers of blocks of data to data transfer threads, the distribution thread may assign a cyclic order to the computation threads associated with the request. Then, the distribution thread may assign transfer(s) of block(s) of data to each data transfer thread that contacts the distribution thread based on which of the block(s) of data that are not yet assigned are associated with the next computation thread(s) in that cyclic order.

In embodiments in which the quantity of available data transfer threads exceeds the quantity of computation threads associated with the request, the distribution thread may proceed fully through the cyclic ordering of computation threads more than once as part of assigning transfers of blocks of data to each data transfer thread that contacts the distribution thread. Again, transfers of blocks of data are assigned in a round robin manner based on the cyclic order given to the computation threads, and the data transfer threads are assigned their data transfers in the order in which they contact the distribution thread. Such assigning of transfers of block(s) of data continues until all transfers of block(s) of data have been assigned.

In embodiments in which the quantity of available data transfer threads is less than the quantity of computation threads associated with the request, the distribution thread may mathematically determine how many of the computation threads to include in each assignment of transfer(s) to each of the data transfer threads prior to transmitting the command and/or prior to assigning transfers of blocks of data to data transfer threads. Depending on whether there are at least twice as many computation threads as data transfer threads, either some or all of the data transfer threads may be assigned transfers of blocks of data associated with more than one computational thread. Transfers of blocks of data may still be assigned in a round robin manner based on the cyclic order given to the computation threads and the data transfer threads may still be assigned their data transfers in the order in which they contact the distribution thread, but the distribution thread may proceed fully through the cyclic ordering of the computation threads only once while making those assignments.

In assigning transfer(s) of block(s) of data to each data transfer thread, the distribution thread may provide that data transfer thread with the network address(es) and/or network port(s) of the one or more computation threads associated with the assigned transfer(s). Each of the data transfer threads may use those network address(es) and/or network port(s) so provided to independently contact those computation thread(s) at those network address(es) and/or network port(s) as part of performing the assigned transfer(s). As each data transfer thread completes the one or more transfers of block(s) of data assigned to it, the computation threads associated with those block(s) may provide an indication of completion of transfer(s) of data blocks to the distribution thread and/or to the device that originated the request.

In embodiments in which the quantity of available data transfer threads is less than the quantity of computation threads associated with the request such that at least one data transfer thread is assigned transfers of blocks of data associated with multiple computation threads, that data transfer thread may order those computation threads into another cyclic ordering that the data transfer thread may use to control its performance of the transfers assigned to it. More precisely, the data transfer thread may transfer one block of data associated with each of those computation threads in round robin order, proceeding fully through the cyclic ordering that it defined as many times as required to perform all transfers of blocks of data assigned to it. In embodiments in which the transfers assigned to that data transfer thread are transfers of blocks of data from the computation threads (and not to the computation threads), ones of those computation threads for which all transfers of blocks of data have been completed may be removed from that cyclic ordering as the data transfer thread continues to proceed again and again through that cyclic ordering in round robin manner as part of completing all transfers assigned to it.

With general reference to notations and nomenclature used herein, portions of the detailed description that follows may be presented in terms of program procedures executed on a computer or network of computers. These procedural descriptions and representations are used by those skilled in the art to most effectively convey the substance of their work to others skilled in the art. A procedure is here, and generally, conceived to be a self-consistent sequence of operations leading to a desired result. These operations are those requiring physical manipulations of physical quantities. Usually, though not necessarily, these quantities take the form of electrical, magnetic or optical communications capable of being stored, transferred, combined, compared, and otherwise manipulated. It proves convenient at times, principally for reasons of common usage, to refer to what is communicated as bits, values, elements, symbols, characters, terms, numbers, or the like. It should be noted, however, that all of these and similar terms are to be associated with the appropriate physical quantities and are merely convenient labels applied to those quantities.

Further, these manipulations are often referred to in terms, such as adding or comparing, which are commonly associated with mental operations performed by a human operator. However, no such capability of a human operator is necessary, or desirable in most cases, in any of the operations described herein that form part of one or more embodiments. Rather, these operations are machine operations. Useful machines for performing operations of various embodiments include digital computers as selectively activated or configured by a computer program stored within that is written in accordance with the teachings herein, and/or include apparatus specially constructed for the required purpose. Various embodiments also relate to apparatus or systems for performing these operations. These apparatus may be specially constructed for the required purpose or may include a computer. The required structure for a variety of these machines will appear from the description given.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, some well known structures and devices are shown in block diagram form in order to facilitate a description thereof. The intention is to cover all modifications, equivalents, and alternatives within the scope of the claims.

FIG. 1 illustrates a block diagram of an example embodiment of analytical system 1000 incorporating one or more of a data storage cluster 1100, a data processing cluster 1300, a coordinating device 500 and/or a viewing device 700 that may cooperate to store, exchange and perform parallel analysis computations involving blocks of data associated with a data set 130. In various embodiments, the data storage cluster 1100 may incorporate only one or more than one storage device 100, and the data processing cluster 1300 may incorporate only one or more than one computation device 300. Multiple threads may be executed within each of the clusters 1100 and 1300 to achieve parallelism in the performance of data transfers and computations involving the data set 130 regardless of whether each of the clusters 1100 and 1300 are made up of a single computing device or multiple computing devices.

Each of the computing devices 100, 300, 500 and 700 may be any of a variety of types of computing device, including without limitation, a desktop computer system, a data entry terminal, a laptop computer, a netbook computer, a tablet computer, a handheld personal data assistant, a smartphone, a digital camera, a body-worn computing device incorporated into clothing, a computing device integrated into a vehicle (e.g., a car, a bicycle, a wheelchair, etc.), a server, a cluster of servers, a server farm, etc. Embodiments are not limited in this context.

As depicted and as will be discussed, these computing devices 100, 300, 500 and/or 700 may exchange communications conveying and/or controlling the parallel conveyance of blocks of data associated with the data set 130 as transfer data 135 through a network 999 in support of the parallel analysis computations. However, one or more of the computing devices 100, 300, 500 and/or 700 may exchange other data entirely unrelated to such calculations and to supporting such calculations with each other and/or with still other computing devices (not shown) via the network 999. In various embodiments, the network 999 may be a single network that may extend within a single building or other relatively limited area, a combination of connected networks that may extend a considerable distance, and/or may include the Internet. Thus, the network 999 may be based on any of a variety (or combination) of communications technologies by which communications may be effected, including without limitation, wired technologies employing electrically and/or optically conductive cabling, and wireless technologies employing infrared, radio frequency or other forms of wireless transmission.

The data set 130 may be any of a variety of types of data, including and not limited to, biological data, economic indicators, financial transactions, securities market prices, sales figures, production figures, census data, weather data, election results, scientific data, medical data, etc. The data set 130 may be stored within one or more of the storage devices 100 for access by one or more of the computation devices 300 in performing analysis computations. In support of such calculations, blocks of data making up a portion of the data set 130 may be exchanged in parallel between the storage device(s) 100 and the computation device(s) 300 through the network 999 as multiple instances of the transfer data 135. Each such parallel transfer of multiple instances of the transfer data 135 may be arranged and controlled by the coordinating device 500, and requests to perform such parallel transfers may originate within one or more computation devices 300, the coordinating device 500 and/or the viewing device 700. In embodiments in which at least a subset of analysis computations are performed to generate a visualization associated with the data set 130, one or more computation devices 300 may transmit data to the viewing device 700 for use in presenting a visualization on a display 780.

To better support the different requirements of the data storage and analysis computation functions, the internal architectures of the storage device(s) 100 and the computation device(s) 300 may have significant differences. By way of example, each of the one or more storage devices 100 may include non-volatile storage made up of a large quantity of storage devices that may each have considerable storage capacity to store at least a portion of the data set 130 and/or updates thereto. Further, each of the one or more storage devices 100 may have an internal architecture that may emphasize speed of throughput in moving data between such storage devices and the network 999. The internal architecture of the one or more storage devices 100 may not emphasize features that enhance processing ability, as it may be deemed unlikely to be needed to perform the data storage function. In contrast, and also by way of example, each of the one or more computation devices 300 may include processor components operating at relatively high clock rates, incorporating relatively large cache systems or employing a relatively high degree of parallelism in the executing computation instructions. Further, each of the one or more computation devices 300 may include volatile storage made up of a large quantity of relatively fast storage devices closely coupled to the processor components to minimize delays in accesses to data stored therein by the processor components. The internal architecture of the one or more computation devices 300 may not emphasize high capacities within and high rates of throughput access to non-volatile storage.

In various embodiments, each of the one or more storage devices 100 of the data storage cluster 1100 incorporates one or more of a processor component 150, a storage 160 and an interface 190 to couple each of the one or more storage devices 100 to the network 999. The storage 160 may store at least a portion of the data set 130. In embodiments in which there is more than one of the storage devices 100 in the storage cluster 1100, the data set 130 may be divided into portions stored among multiple ones of the storage devices 100, and/or multiple copies of at least portions of the data set 130 may be stored among multiple ones of the storage devices to provide some degree of storage redundancy. Within each of the one or more storage devices 100, there may be one or more portions of the storage 160 that may each be allocated to a data transfer thread 155 executed by the processor component 150. Each such portion of the storage 160 may store one or more of an instance of the transfer data 135, an instance of a storage routine 140, an instance of a transfer routine 170 and an instance of control data 535.

In support of transferring multiple instances of the transfer data 135 in parallel between the storage device(s) 100 of the data storage cluster 1100 and the computation device(s) 300 of the data processing cluster 1300, the processor component (s) 150 of the one or more storage devices 100 may, together, execute a multitude of the data transfer threads 155. Either multiple ones of the data transfer threads 155 are executed by one or more processor components 150 of a single storage device 100, or the execution of multiple ones of the data transfer threads 155 is performed across processor components 150 of multiple storage devices 100. As recognizable to those skilled in the art, depending on various factors of the internal architecture of the data storage cluster 1100, the quantity of the data transfer threads 155 that may be instantiated and executed such that they are available to perform data transfers may change over time. Maintenance operations and/or the replacement of threads demonstrating improper behavior may effect changes in the quantity of available data transfer threads 155.

Within each of the data transfer threads 155, the storage routine 140 and the transfer routine 170 may each incorporate a sequence of instructions operative on the processor component 150 to implement logic to perform various functions. In executing an instance of the storage routine 140, the processor component 150 may be caused to perform or support the performance of a search of at least a portion of the data set 130 for particular pieces of data (e.g., particular blocks of data) in response to a query for that piece of data. Alternatively or additionally, the processor component 150 may be caused to retrieve a portion of the data set 130 that includes a sought-after piece of data after the location of such a block of data within the data set 130 has been determined. Across the multiple data transfer threads 155, whether all executed within a single storage device 100 or distributed for execution among multiple storage devices 100, the instances of the storage routine 140 within each of the data transfer threads 155 may coordinate such searches for and/or such retrievals of data.

In further executing an instance of the storage routine 140, the processor component 150 may be caused to receive a command transmitted through the network 999 from a distribution routine 570 executed within a distribution thread 555 of the coordinating device 500 for the data transfer thread 155 in which the instance of the storage routine 140 is executed to contact the distribution thread 555 to request an assignment to transfer one or more blocks of data. In responding to such a command, the processor component 150 may execute the instance of the transfer routine 170 that is associated with that data transfer thread 155. In so doing, the processor component 150 may be caused by such execution to contact the distribution thread 555 via the network 999 as commanded to request an assignment of a transfer of one or more blocks of data. In response to the assignment, the processor component 150 may be further caused to perform the transfer(s) of the one or more blocks of data that are so assigned.

In various embodiments, each of the one or more computation devices 300 of the data processing cluster 1300 incorporates one or more of a processor component 350, a storage 360 and an interface 390 to couple each of the one or more computation devices 300 to the network 999. Within each of the one or more computation devices 300, there may be one or more portions of the storage 360 that may each be allocated to a computation thread 355 executed by the processor component 350. Each such portion of the storage 360 may store one or more of an instance of the transfer data 135, an instance of computation data 330, an instance of a computation routine 340 and an instance of a transfer routine 370.

In support of performing multiple instances of analytical calculations in parallel, the processor component(s) 350 of the one or more computation devices 300 of the data processing cluster 1300 may, together, execute a multitude of the computation threads 355. Either multiple ones of the computation threads 355 are executed by one or more processor components 350 of a single computation device 300, or the execution of multiple ones of the computation threads 355 is performed across processor components 350 of multiple computation devices 300.

Within each of the computation threads 355, the computation routine 340 and the transfer routine 370 may each incorporate a sequence of instructions operative on the processor component 350 to implement logic to perform various functions. In executing an instance of the computation routine 340, the processor component 350 may be caused to perform analysis calculations involving a portion of the data set 130 transferred from and/or to one or more storage devices 100 as the transfer data 135. Alternatively or additionally, the processor component 350 may be caused to transmit data to the viewing device for use in presenting a visualization associated with the data set 130. Across the multiple computation threads 355, whether all executed within a single computation device 300 or distributed for execution among multiple computation devices 300, the instances of the computation routine 340 within each of the computation threads 355 may coordinate such computations and/or aggregate results thereamong.

In further executing an instance of the computation routine 340 associated with one instance of the computation thread 355, the processor component 350 may be caused to originate a request that may be conveyed through the network 999 to a control routine 540 of the coordinating device 500 for the transfer of one or more blocks of data between the storage device(s) 100 and the computation device(s) 300. As has been described, such a request may lead to one or more instances of the data transfer thread 155 each contacting one or more instances of the computation thread 355 to effect transfer(s) of one or more blocks of data. In responding to such contact by one or more instances of the data transfer thread 155, the processor component 350 may execute the instance of the transfer routine 370 that is associated with that instance of the computation thread 355. In so doing, the processor component 350 may cooperate with those one or more instances of the data transfer thread 155 to transfer the one or more blocks of data as the transfer data 135.

In various embodiments, the coordinating device 500 incorporates one or more of a processor component 550, a storage 560 and an interface 590 to couple the coordinating device 500 to the network 999. The storage 560 may store one or more of configuration data 530 and the control routine 540. A portion of the storage 560 may also be allocated to the distribution thread 555 executed by the processor component 550. Such a portion of the storage 560 may store one or both of multiple instances of control data 535 and an instance of the distribution routine 570.

The control routine 540 and the distribution routine 570 within the distribution thread 555 may each incorporate a sequence of instructions operative on the processor component 550 to implement logic to perform various functions. In executing the control routine 540, the processor component 550 may be caused to recurringly monitor for indications of quantities of the data transfer threads 155 that are available to use in transferring blocks of data and/or quantities of the computation threads 355 that are engaged in performing computations. The processor component 550 may also receive requests for parallel transfers of blocks of data to be performed from one of the computation devices 300 and/or from the viewing device 700.

In further executing the control routine 540, the processor component 550 may respond to the receipt of a request to perform transfers of blocks of data between the one or more storage devices 100 of the data storage cluster 1100 and the one or more computation devices 300 of the data processing cluster 1300 by instantiating the distribution thread 555 and/or providing the distribution routine 570 with information concerning the received request. Thus, in response to the receipt of the request, the processor component 550 may execute the distribution routine 570 within the distribution thread 555 to employ one or both of information provided in the request and information retrieved through the recurring monitoring of the data transfer threads 155 and/or the computation threads 355 to generate and transmit a command to at least one of the storage devices 100. Again, the command may be for available ones of the data transfer threads 155 executed within the data storage cluster 1100 to each independently contact the distribution thread 555 via the network 999 to request to be assigned transfer(s) of blocks(s) of data to perform.

In various embodiments, the viewing device 700 incorporates one or more of a processor component 750, a storage 760, a display 780, controls 720 and an interface 790 to couple the viewing device 700 to the network 999. The storage 760 may store one or more of each of viewing data 730 and a control routine 740. The viewing data 730 may include data from which a visualization associated with the data set 130 may be generated or may include a representation of the visualization, itself.

The control routine 740 may incorporate a sequence of instructions operative on the processor component 750 to implement logic to perform various functions. In executing the control routine 740, the processor component 750 may be caused to receive pieces of data from one or more of the computation threads 355 from which the processor component 750 may generate the viewing data 730, or the processor component 750 may receive the viewing data 730 from one of the computation devices 300. Upon receiving and/or generating the viewing data 730, the processor component 750 may operate the display 780 to visually present the visualization.

Alternatively or additionally, in executing the control routine 740, the processor component 750 may monitor the controls 720 for an indication of operation of the controls 720 by an operator of the viewing device 700 to request the performance of a search, a computation and/or other operation(s) to generate the visualization. Such a request may therefore result in the performance of analysis computations by the computation threads 355. In support of such computations, the processor component 750 may transmit a request for transfers of blocks of data to the coordinating device 500.

Figure 2:
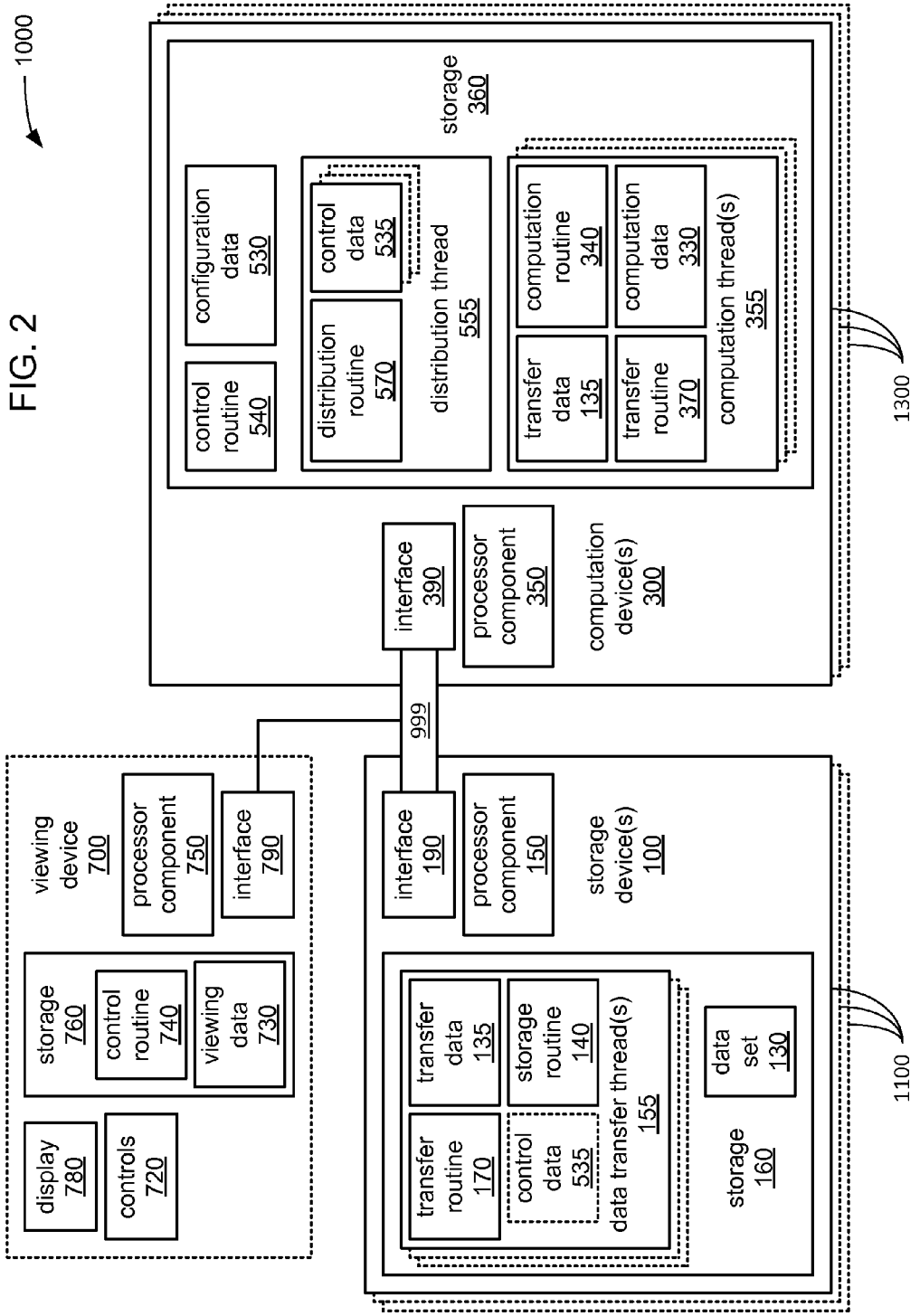
FIG. 2 illustrates an alternate example embodiment of an analytical system.

FIG. 2 illustrates a block diagram of an alternate example embodiment of the visualization system 1000 featuring an alternate embodiment of one of the computation devices 300 that subsumes the monitoring of threads and the distribution of data transfer assignments performed by the coordinating device 500 of FIG. 1. Thus, such functions may be performed within the data processing cluster 1300 in FIG. 2. In FIG. 2, the storage 360 within that alternate embodiment of that one of the computation devices 300 additionally incorporates one or more of the configuration data 530, the control routine 540. Further, a portion of the storage 360 may be allocated to the distribution thread 555, with the distribution routine 570 and multiple instances of the control data 535 stored therein. The processor component 350 may execute the control routine 540 to perform the previously described recurring monitoring of the data transfer threads 155 and/or of the computation threads 355. Alternatively and/or additionally, the processor component 350 may execute the distribution routine 570 to perform the assignment of transfers of blocks of data to multiple ones of the data transfer threads 155.

Figure 3:
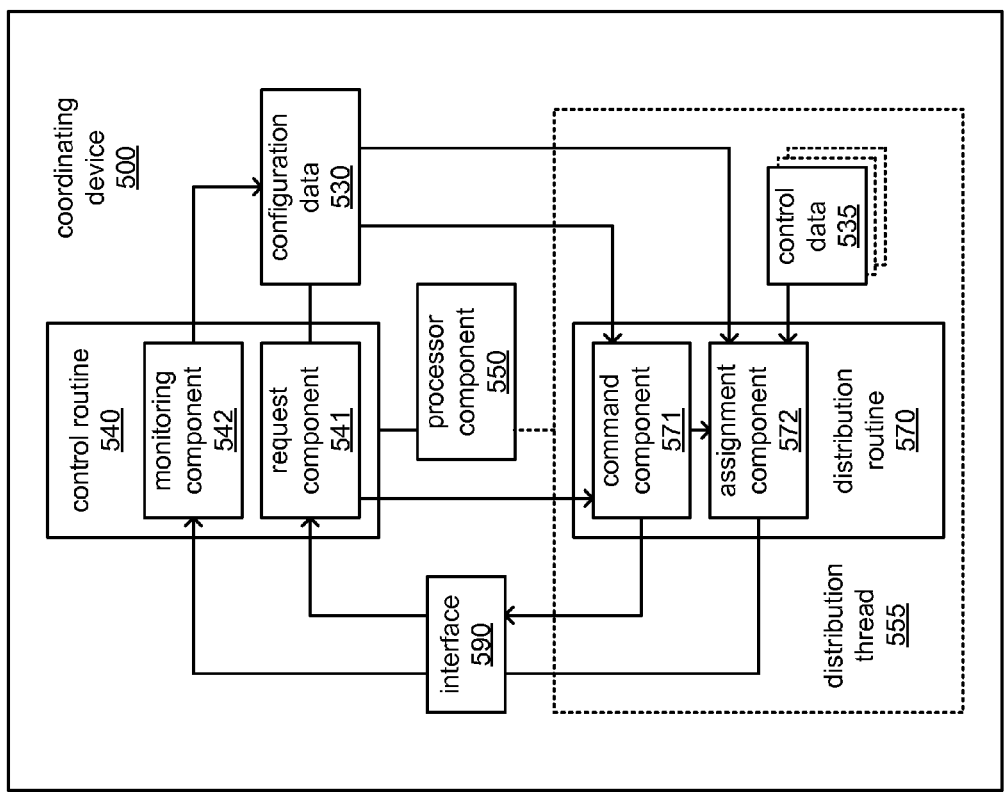
FIGS. 3, 4 and 5 each illustrates a portion of an example embodiment of an analytical system.
Figure 4:
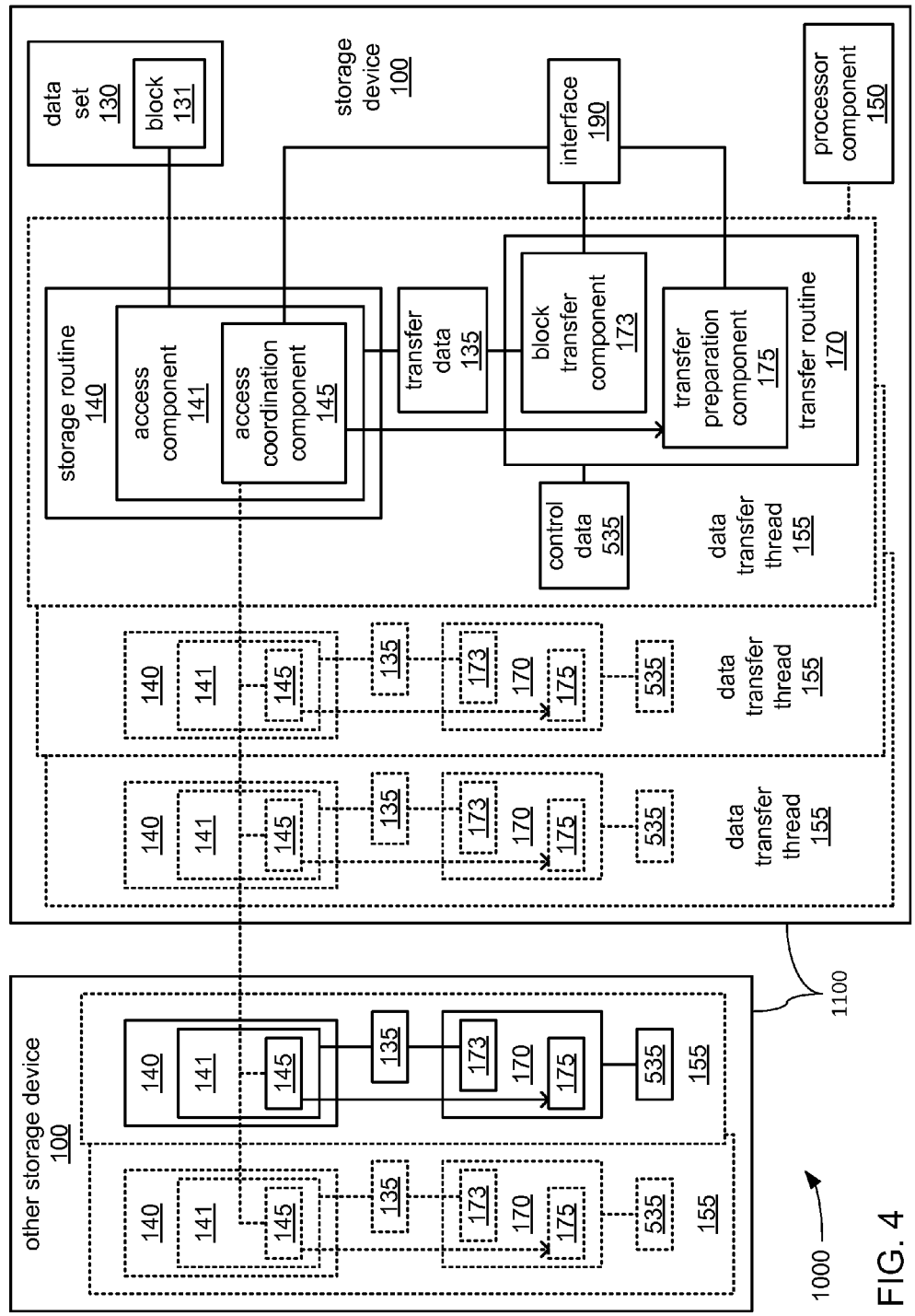
Figure 5:
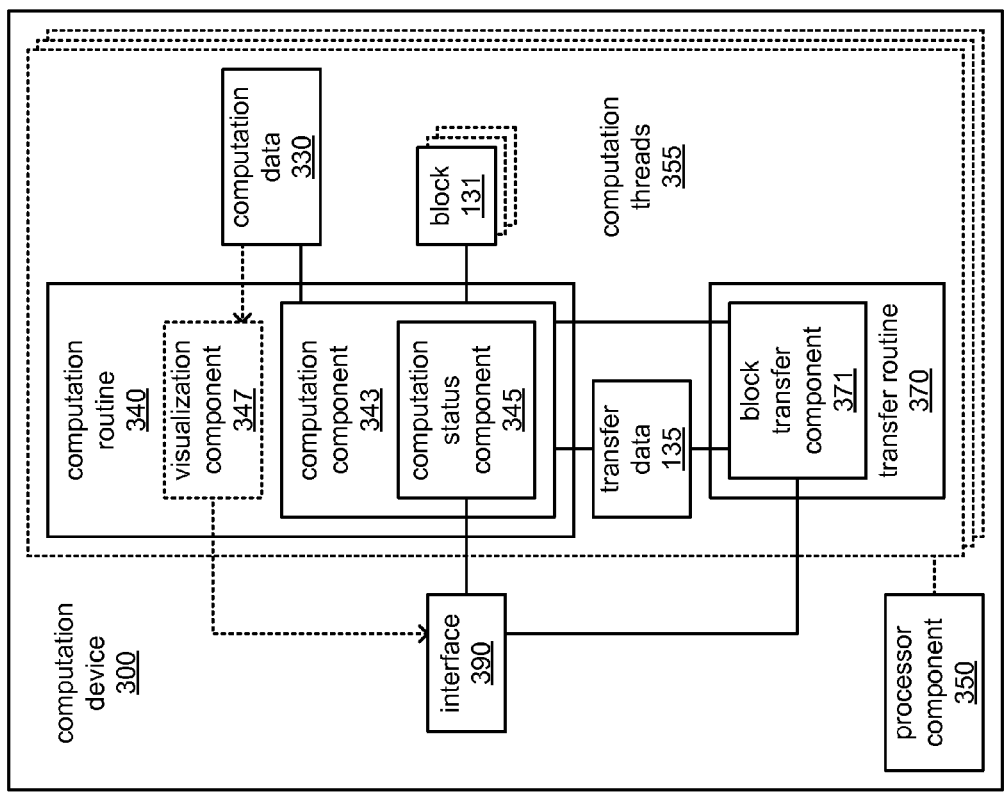

FIGS. 3, 4 and 5 each illustrate a block diagram of a portion of an embodiment of the analytical system 1000. More specifically, FIG. 3 depicts aspects of the operating environment of one embodiment of the coordinating device 500 in which the processor component 550, in executing the control routine 540 and the distribution routine 570, may await and receive a request for the parallel performance of data transfers and may assign those data transfers to be performed by multiple data transfer threads 155 in response to that request. FIG. 4 depicts aspects of the operating environment of at least one of the storage devices 100 in which the processor component 150, in executing one or more instances of the storage routine 140 and the transfer routine 170, provides access to blocks of data of the data set 130 and transfers such blocks of data between one of the storage devices 100 and one or more of the computation devices 300. FIG. 5 depicts aspects of the operating environment of at least one of the computation devices 300 in which the processor component 350, in executing one or more instances of the computation routine 340 and the transfer routine 370, performs analysis computations involving blocks of data of the data set 130 and transfers such blocks of data between one of the computation devices 300 and one or more of the storage devices 100.

As recognizable to those skilled in the art, the routines 140, 170, 340, 370, 540, 570 and 740, including the components of which each is composed, are selected to be operative on whatever type of processor or processors that are selected to implement applicable ones of the processor components 150, 350, 550 or 750. In various embodiments, each of the routines 140, 170, 340, 370, 540, 570 and 740 may include one or more of an operating system, device drivers and/or application-level routines (e.g., so-called "software suites" provided on disc media, "applets" obtained from a remote server, etc.). Where an operating system is included, the operating system may be any of a variety of available operating systems appropriate for whatever corresponding ones of the processor components 150, 350, 550 or 750. Where one or more device drivers are included, those device drivers may provide support for any of a variety of other components, whether hardware or software components, of corresponding ones of the computing devices 100, 300, 500 or 700.

Turning to FIG. 3, the control routine 540 may include a monitoring component 542 executable by the processor component 550 to operate the interface 590 to recurringly receive indications via the network 999 of quantities of data transfer threads 155 available to be assigned data transfers and/or of computation threads 355 currently engaged in performing analysis computations. The monitoring routine 542 may recurringly request such indications from one or more of the storage devices 100 and/or from one or more of the computation devices 300. Alternatively or additionally, one or more of the storage devices 100 and/or one or more of the computation devices 300 may provide such indications to the monitoring component 542 in response to changes in quantities of the threads 155 and/or 355. The monitoring component 542 may store such indications of quantities within the configuration data 530 for subsequent use in arranging transfers of blocks of data associated with the data set 130.

Turning to FIG. 4, within each of the data transfer threads 155 that may be executed by the processor component 150 within a storage device 100, the storage routine 140 may include an access component 141 executable by that processor component 150 to store blocks 131 of data as part of the data set 130 and/or to retrieve blocks 131 of data therefrom. As previously explained, there may be a single storage device 100 that stores all of the data set 130 or there may be multiple storage devices 100 that cooperate to store the data set 130 in a manner in which the data set 130 may be divided thereamong in any of a variety of ways that may enhance speed of access thereto and/or redundancy of storage thereof. The access component 141 may so provide such access to blocks 131 of data of the data set 130 in response to search requests and/or other forms of request for access.

As depicted, the access component 141 may incorporate an access coordination component 145 executable by the processor component 150 to coordinate access operations performed by the access component 141 within one of the data transfer threads 155 with corresponding access operations performed by the access components 141 of others of the data transfer threads 155. The access coordination component 141 may provide such coordination regardless of whether those other data transfer threads 155 are executed within the same storage device 100 or a different one of the storage devices 100. By way of example, a request to search for and retrieve a particular piece of data that is received by the access component 141 of one of the data transfer threads 155 may be shared among the access coordination components 145 within each of the data transfer threads 155 to enable multiple portions of the data set 130 that may be distributed across multiple storage devices 100 to be searched in response to the request.

As another example of coordination provided by the access coordination components 145 within each of multiple data transfer threads 155 may be a recurring sharing of information concerning the current status of each of the data transfer threads 155. More precisely, indications of whether each of the data transfer threads 155 is available to be assigned a data transfer operation may be recurringly gathered by the access coordination components 145 of each of the data transfer threads 155, and then the access component 141 of one of the data transfer threads 155 may recurringly generate and transmit an indication of the quantity of the data transfer threads 155 are so available to the monitoring component 542. In some embodiments, such indications recurringly transmitted to the monitoring component 542 may include an indication of a network address of that one of the access components 141 on the network to provide the distribution thread 555 with a network address to which to later direct a command to perform transfers of blocks of data.

Turning to FIG. 5, within each of the computation threads 355 that may be executed by the processor component 350 within a computation device 300, the computation routine 340 may include an computation component 343 executable by the processor component 350 to perform analysis computations involving blocks 131 of data of the data set 130 at least partly in parallel with the computation components 343 of others computation threads 355. As recognizable to those skilled in the art, as the computation component 343 performs such computations, results achieved at various intermediate steps in performing such computations may need to be temporarily stored, and the computation component 343 may store such results as part of the computation data 330. The computation data 330 may also serve as a temporary buffer for values resulting from computations that have as yet to be transferred back to one or more of the storage devices 100 for inclusion in the data set 130.

As depicted, the computation component 343 may incorporate a computation status component 345 executable by the processor component 350 to gather indications of the current status of the computation components 343 of multiple ones of the computation threads 355. More precisely, indications of whether each of the computation threads 355 is currently engaged in performing computations may be recurringly gathered by the computation status component 345 of each of the computation threads 355, and then the computation status component 345 of one of the computation threads 355 may recurringly generate and transmit an indication of how many of the computation threads 355 are so engaged to the monitoring component 542. In some embodiments, such indications recurringly transmitted to the monitoring component 542 may include an indication of a network address of that one of the computation status components 345. The computation status components 345 may perform such gathering of indications of status from the computation component 343 of each of multiple computation threads 355 regardless of whether some of those computation threads 355 are executed within different computation devices 300.

Figure 6A:
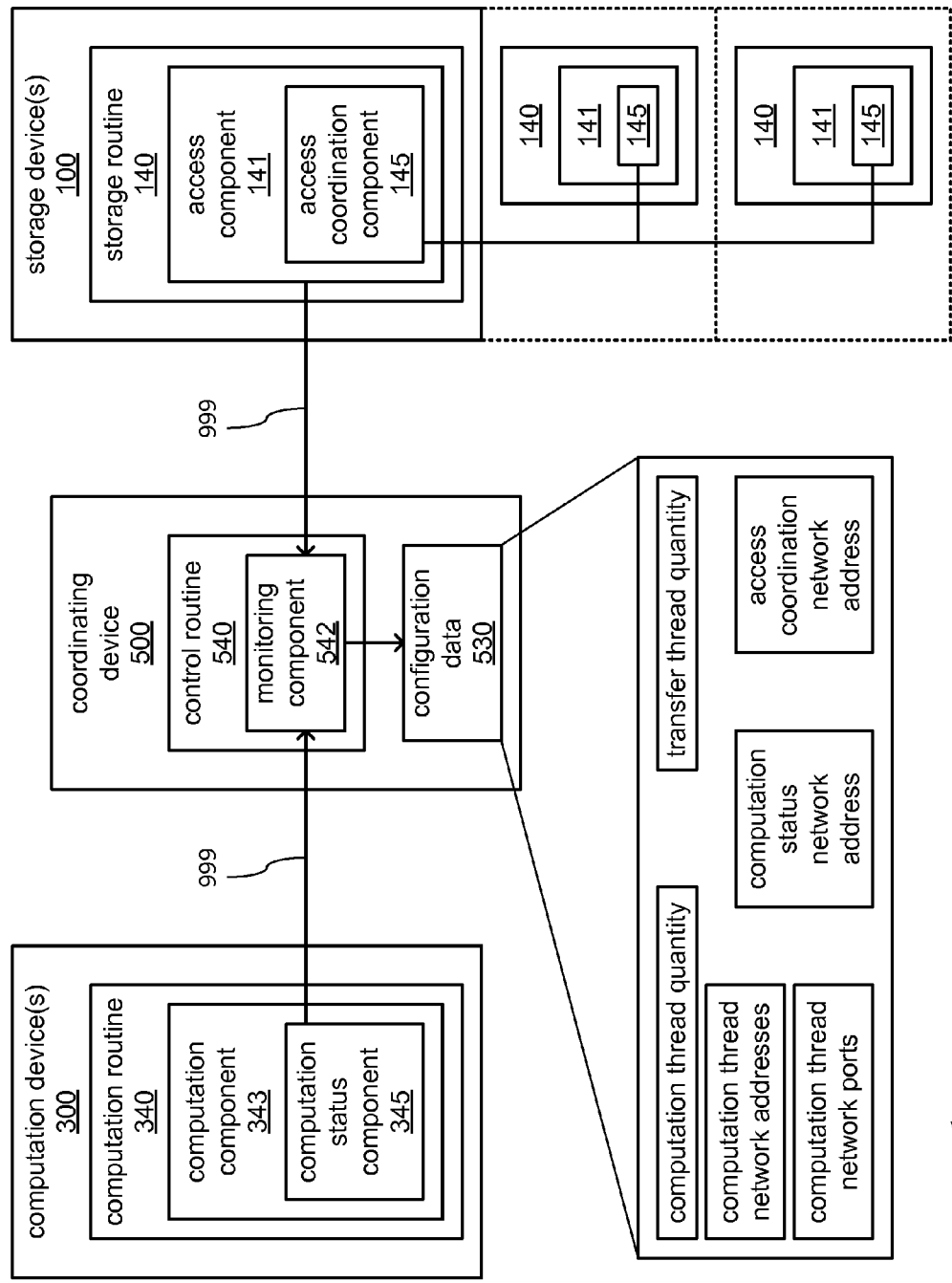
FIGS. 6A to 6E, together, illustrate an example embodiment of assignment and transfer of multiple blocks of data in an analytical system.

Thus, and returning to FIG. 3, the monitoring component 542 may receive indications of quantities of threads and/or network addresses from the access component 141 of one of the data transfer threads 155 and/or from the computation status component 345 of one of the computation threads 355. FIG. 6A depicts an example of the reception of such indications by the monitoring component 542 in greater detail. Again and as depicted, the monitoring component 542 may store indications of such quantities of threads and/or network addresses as part of the configuration data 530. Specifically, among what is so stored may be quantities of data transfer threads 155 available and of computation threads 355 in use, network addresses of those computation threads 355 on the network 999, and/or network addresses of the one access component 141 and the one computation status component 345 that provides such indications to the monitoring component 542. In embodiments in which Internet protocol (IP) addressing or a similar network addressing scheme is employed, the configuration data 530 may additionally include indications of port numbers at which individual ones of the computation threads 355 that share a network address may be accessed on the network 999.

Continuing with FIG. 3, the control routine 540 may include a request component 541 executable by the processor component 550 to operate the interface 590 to await receipt from another device of a request for the performance of multiple data transfers to transfer of multiple blocks 131 of data in parallel. Such a request may emanate from one or more of the computation devices 300 as a result of needing to transfer multiple blocks 131 of data representing results of computations back to where the data set 130 is stored within one or more of the storage devices 100, and/or as a result of needing to transfer blocks 131 of data from the data set 130 to one or more of the computation devices 300 as inputs for further computations. Alternatively, such a request to transfer multiple blocks 131 of data in parallel may emanate from the viewing device 700 as part of a request provided to the viewing device 700 via the controls 720 to generate a visualization associated with the data set 130 for presentation (e.g., on the display 780) where various computations are required to do so.

The received request may include indications of which computation threads 355 are to be involved in the requested transfers of blocks of data. In embodiments in which network addresses and/or port numbers of those computation threads 355 are not received by the monitoring component 542 during the aforedescribed recurring monitoring, the request received by the request component 541 may include such information and the request component 541 may store indications of those network addresses and/or port numbers as part of the configuration data 530.

Within the distribution thread 555, the distribution routine 570 may include a command component 571 executable by the processor component 550 to receive an indication from the request component 541 of a request for the transfer of blocks 131 of data having been received. In some embodiments, the distribution thread 555 may not be instantiated by the processor component 550 until such a request has been received such that the distribution routine 570 may not be executed until such a request is received. Regardless of whether instantiation of the distribution thread 555 and/or execution of the distribution routine 570 occurs only in response to the receipt of a request, the command component 571 employs at least the indication in the configuration data 530 of the quantity of data transfer threads 155 available to generate a command for those data transfer threads 155 to contact the distribution thread 555 to each be assigned a transfer of one or more blocks 131 of data to perform. The command component 571 may then employ the indication in the configuration data 530 of the network address of one of the one access components 141 of one of the data transfer threads 155 (e.g., the one of the access components 141 from which indications of quantities of available data transfer threads 155 have been received) as the destination to which to transmit the command.

Turning again to FIG. 4, within each of the data transfer threads 155, the transfer routine 170 may include a transfer preparation component 175 executable by the processor component 150 to contact the distribution thread 555 in response to receipt of the command transmitted by the command component 571 thereof at the network address indicated in the command to receive an assignment to transfer one or more block 131 of data to or form one or more specific computation threads 355. As a result of so contacting the distribution thread 555, the transfer preparation component 175 may receive and then store an instance of the control data 535 that includes indications of which computation thread(s) 355 are to have one or more blocks 131 of data retrieved therefrom or provided thereto, and/or indications of network address(es) and/or port number(s) at which those computation thread(s) 355 may be accessed via the network 999. For transfers of block(s) of data 131 to one or more computation threads 355, the instance of control data 535 so received may also include an index or other identifier of what block(s) of data 131 are to be so transferred.

Figure 6B:
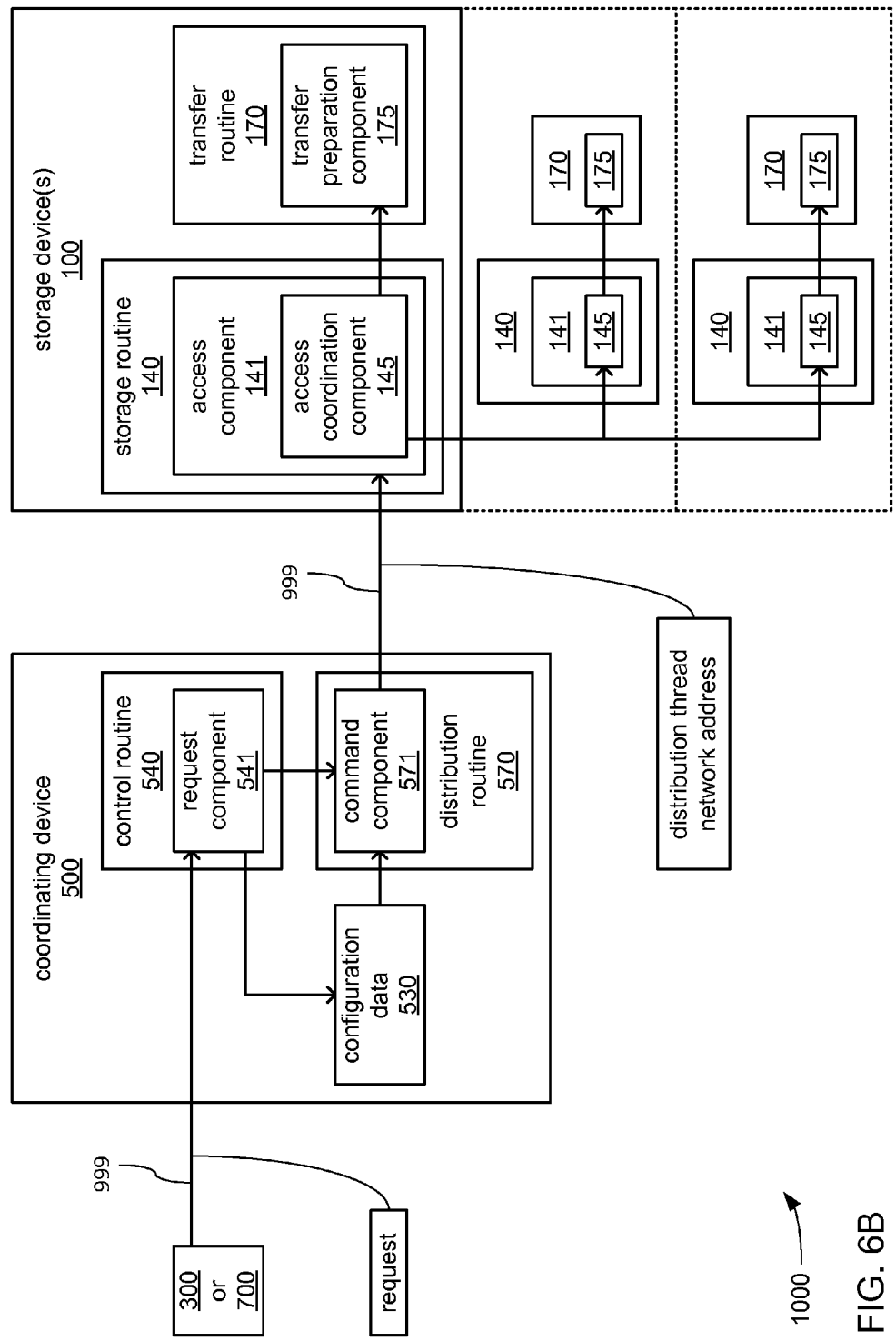

As previously discussed, the distribution thread 555 may transmit the command to the access component 141 within one of the data transfer threads 155 which may employ the access coordination component 145 incorporated therein to distribute the command among multiple ones of the data transfer threads. Thus, the transfer preparation component 175 of each of the data transfer threads 155 may receive the command from the access coordination component 145 within the same data transfer thread 155 as that transfer preparation component 175. FIG. 6B depicts an example of the reception of a request for the transfer of multiple blocks 131 of data, the resulting generation and transmission of a command to contact the distribution thread 555, and the distribution of that command among multiple ones of the transfer preparation components 175 by multiple ones of the access coordination components 145. Again and as depicted, the request component 541 may receive the request from either a computation device 300 or the viewing device 700.

As a result of such distribution of the command, the transfer preparation component 175 of each of the available data transfer threads 155 may independently contact the distribution thread 555 in response to having the command relayed thereto via the access coordination components 145. As a result of each so contacting the distribution thread 555, each may be provided with its own instance of the control data 535 specifying the aforedescribed aspects of the data transfer assigned to it.

Figure 6C:
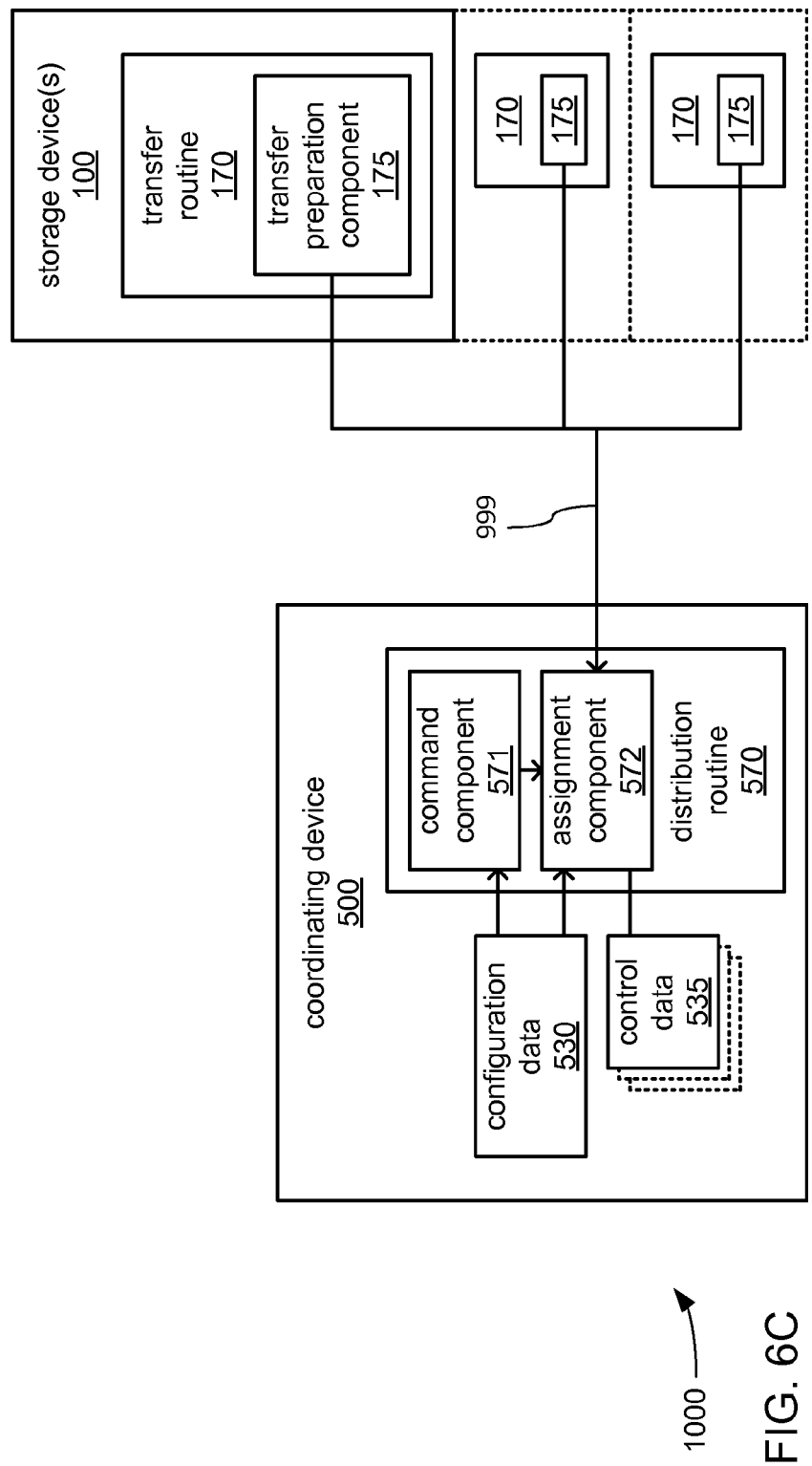
Figure 6D:
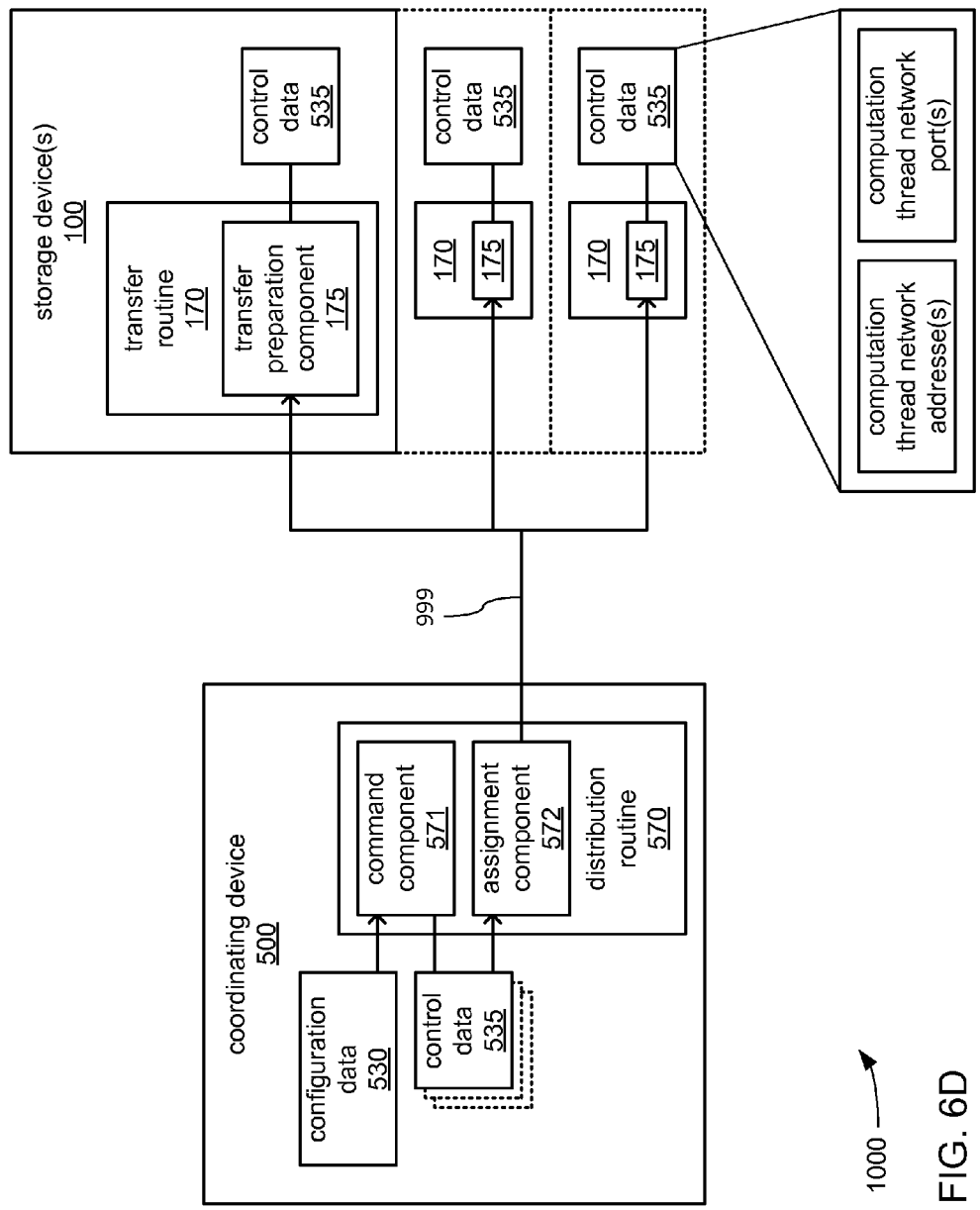

Returning to FIG. 3, the distribution routine 570 may include an assignment component 572 executable by the processor component 550 to assign transfers of blocks 131 of data to each of the data transfer threads 155 that contacts the distribution thread 155 in response to the earlier transmitted command, as has been described. For each data transfer thread 155 that so contacts the distribution thread 555, the assignment component 572 generates and provides a separate instance of the control data 535 specifying aspects of the transfer of one or more blocks 131 of data assigned to that data transfer thread 155, thereby effecting the assignment of that transfer to that data transfer thread 155. FIG. 6C depicts an example of the resulting independent contacting of the assignment component 572 by each of the transfer preparation components 175. FIG. 6D depicts an example of the resulting provision of separate instances of the control data 535 by the assignment component 572 to each of those transfer preparation components 175. Again, as depicted, each of the instances of the control data 535 may include indications of network addresses and/or port numbers for one or more computation threads 355 involved in the transfer of blocks 131 of data assigned to each data transfer thread 155.

Turning again to FIG. 4, within each of the data transfer threads 155, the transfer routine 170 may include a block transfer component 173 executable by the processor component 150 to perform the transfer of one or more blocks 131 of data assigned to that data transfer thread 155 by the assignment component 572 of the distribution thread 555 as earlier described. Again, the different instances of the control data 535 provided to each data transfer thread 155 as part of assigning a transfer of a block 131 of data thereto may provide an indication of what block(s) 131 to so transfer by specifying at least a network address and/or port number of the computation thread(s) 355 with which those blocks 131 are to be exchanged. Turning again to FIG. 5, within each of the computation threads 355, the transfer routine 370 may include a block transfer component 371 executable by the processor component 350 to be engaged by and to cooperate with one or more of the data transfer component(s) 173 of one or more data transfer threads 155 to exchange one or more blocks 131 of data therewith.

Figure 6E:
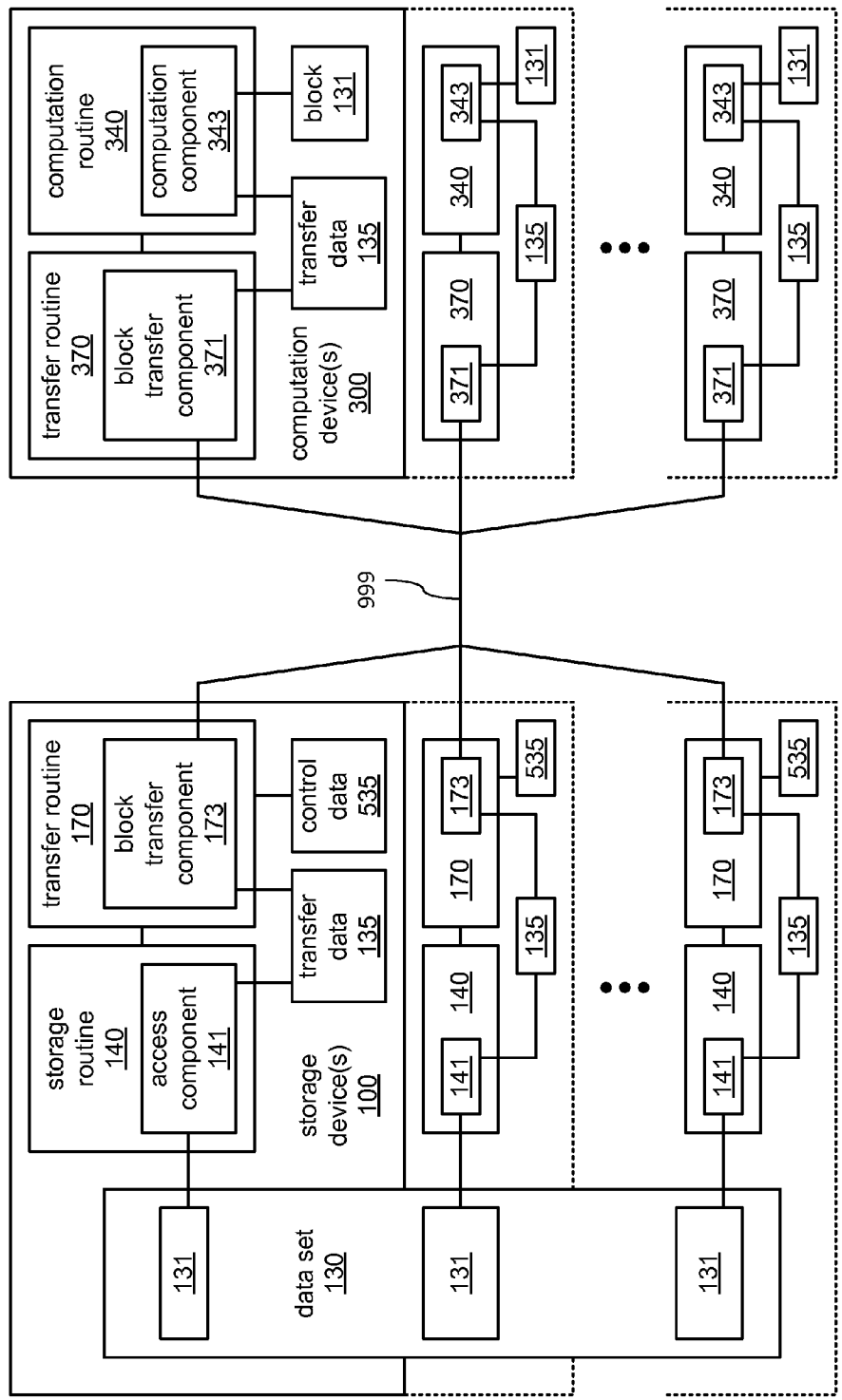

As depicted in both FIGS. 4 and 5, and as previously discussed, the transfer(s) of one or more blocks 131 of data may be effected as transfer(s) of transfer data 135 made up of the one or more blocks 131 of data to be transferred. As familiar to those skilled in the art, blocks of data transferred through a network may be subdivided, combined and/or otherwise reorganized or reformatted into a configuration appropriate for transfer in packetized form or another form appropriate for the transfer of data via a network. Thus, each of the block transfer components 173 and 371 may perform some degree of format conversion to enable the transfer of blocks 131 of data through the network 999 as the appropriately formatted transfer data 135. Following assignment of data transfers to each available one of the data transfer threads 155, the data transfers performed by each may proceed autonomously without further guidance by the distribution thread 555 until all of the blocks 131 of data that are assigned to be transferred have been so transferred. FIG. 6E depicts an example of such parallel independent transfers of blocks 131 of data between different ones of block transfer components 137 and 371 as separate instances of transfer data 135.

Turning again to FIG. 5, the computation status components 345 of each of the computation threads 355 may gather indications from the block transfer components 371 of each of the computation threads 355 as to whether the transfer of blocks 131 of data associated with each of the computation threads 355 is complete. In some embodiments, one of the computation status components 371 may transmit an indication of requested transfers of blocks 131 of data having been completed.

The computation status components 345 of the multiple computation threads 355 may also gather indications of whether the computation component 343 within each of multiple computation threads 355 has completed a particular computation that is being performed at least partly in parallel among those computation threads 355. Upon completion or in anticipation of completion of that particular computation by the computation components 343 of all of those computation threads 355, one of the computation status components 345 may generate and transmit another request for the transfer of blocks 131 of data that include the results of those computations back to the storage device(s) 100 and/or a request for the transfer of blocks 131 of data to those computation threads 355 that will be needed as input for another computation.

Returning to FIG. 3, as has been discussed, each of the data transfer threads 155 may be assigned to exchange block(s) 131 of data with either a single computation thread 355 or multiple computation threads 355 depending on whether the quantity of data transfer threads 155 available to be so assigned is less than or greater than the quantity of computation threads associated with a request for the transfer of multiple blocks 131 received by the request component 541. If these two quantities of threads are equal, then transfers of block(s) 131 of data may be assigned to the data transfer threads 155 with a one-to-one correspondence such that each one of the data transfer threads 155 is assigned to transfer the block(s) 131 of data associated with one of the computation threads 355. However, given the wide variation in architectures that may be employed by the data storage cluster 1100 and/or the data processing cluster 1300, it may be deemed unlikely that these two quantities of threads will be equal.

Figure 7:
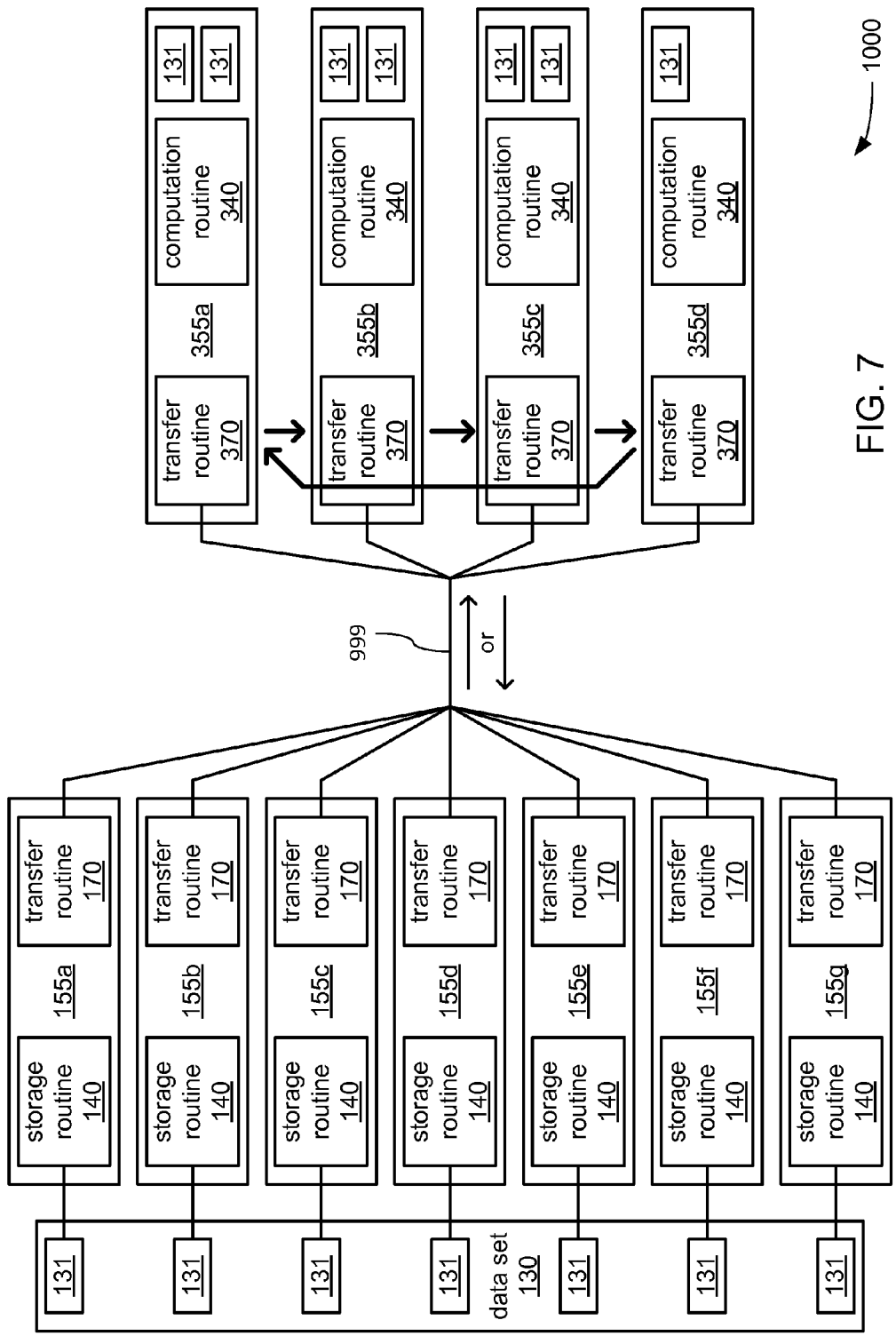
FIG. 7 illustrates an example embodiment of transferring blocks in an analytical system with unequal quantities of data transfer and computation threads.

FIG. 7 depicts an example of transferring of multiple blocks 131 of data in which the quantity of available data transfer threads 155 exceeds the quantity of computation threads 355 associated with a request. More specifically, in FIG. 7, seven data transfer threads 155a-g executed within the data storage cluster 1100 are each assigned to transfer one of seven blocks 131 of data either to or from one or more of four computation threads 355a-d executed within the data processing cluster 1300. Each of the data transfer threads 155a-g is an instance of the data transfer thread 155, and each of the computation threads 355a-d may be an instance of the computation thread 355. It should be noted that although only seven of the data transfer threads 155 and only four of the computation threads 355 are depicted and discussed, these quantities were selected merely to provide an example to enable understanding, and should not be taken as limiting. Other embodiments may include different quantities of these threads, and indeed, it is envisioned that there may be embodiments that include considerably greater quantities of both of the data transfer threads 155 and of the computation threads 355.

As previously discussed, the assignment component 572 within the distribution thread 555 may order the four computation threads 355a-d into a cyclic ordering. As depicted in this example, that ordering may proceed from 355a to 355d and circle back around to 355a, again. As also previously discussed, each of the data transfer threads 155a-g may be assigned a transfer to perform in the order in which the data transfer threads 155a-g contact the distribution thread 555 to request an assignment of a transfer. Presuming that the data transfer threads 155a-g are numbered 155a through 155g based on the order in which they contact the distribution thread 555, then each of the data transfer threads 155a-d may be assigned to transfer a block 131 of data to or from a corresponding one of the computation threads 355a-d, respectively. Then, each of the data transfer threads 155e-g may be assigned to transfer a block 131 of data to or from on of the computation threads 355a-c, respectively.

As a result of the round robin manner of assignment based on the depicted cyclic ordering of the computation threads 355a-d, the computation thread 355a is involved in transfers with both of the data transfer threads 155a and 155e; the computation thread 355b is involved in transfers with both of the data transfer threads 155b and 155f; the computation thread 355c is involved in transfers with both of the data transfer threads 155c and 155g; and the computation thread 355d is involved in a transfer with the data transfer thread 155d. Through such use of assignment of transfers based on such a cyclic ordering of the computation threads 355a-d and based on the order in which each of the data transfer threads 155a-g contacts the distribution thread 555, the work of transferring the seven depicted blocks 131 of data (whether to or from the computation threads 355a-d) is relatively evenly distributed among the data transfer threads 155a-g.

Figure 8:
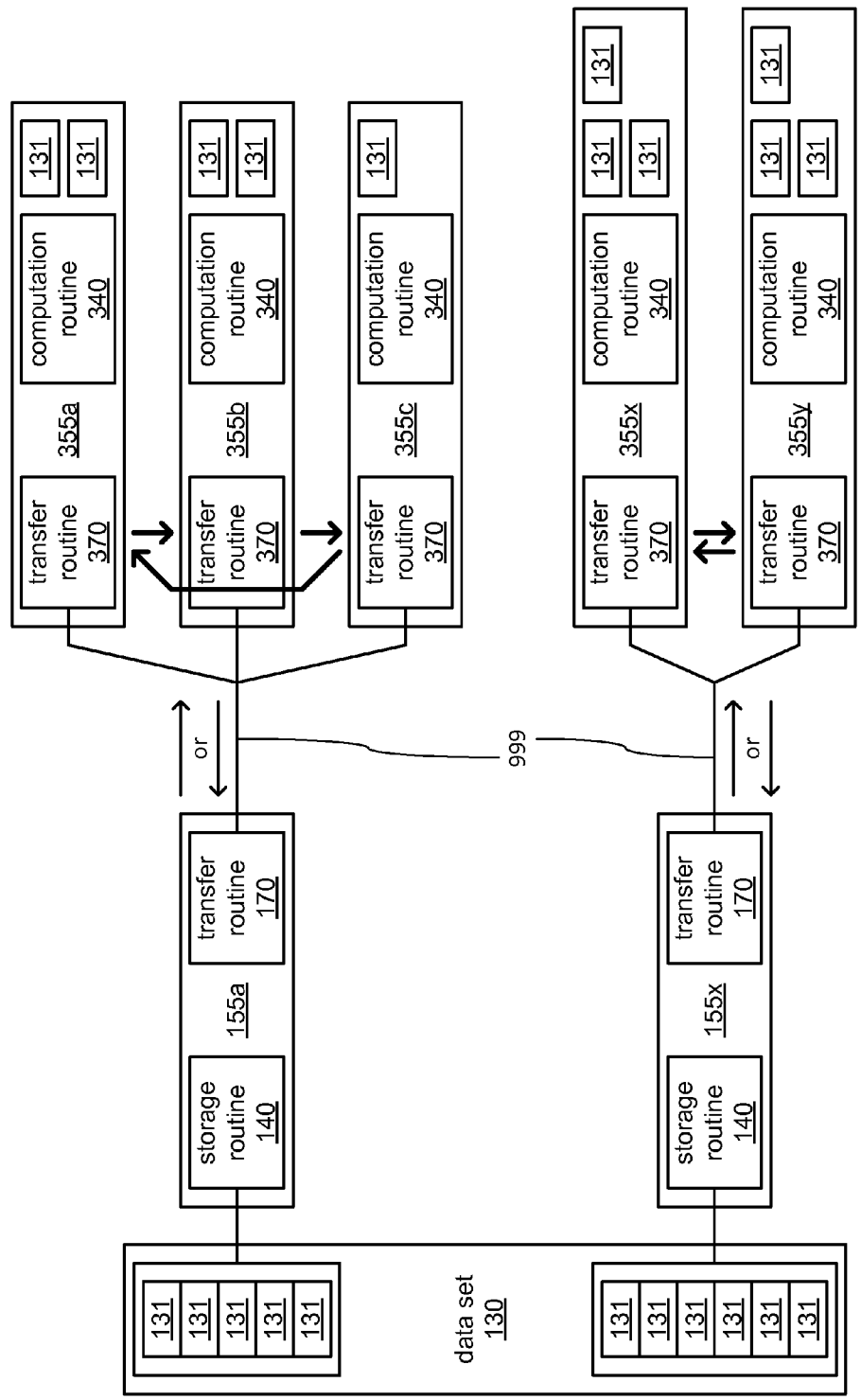
FIG. 8 illustrates another example embodiment of transferring blocks in an analytical system with unequal quantities of data transfer and computation threads.

FIG. 8 depicts an example of transferring multiple blocks 131 of data in which the quantity of available data transfer threads 155 is less than the quantity of computation threads 355 associated with a request. More specifically, in FIG. 8, two data transfer threads 155a and 155x executed within the data storage cluster 1100 are each assigned to transfer two blocks 131 of data either to or from each of various ones of five computation threads 355a-c and 355x-y executed within the data processing cluster 1300. Again, each of the data transfer threads 155a and 155x is an instance of the data transfer thread 155, and each of the computation threads 355a-c and 355x-y may be an instance of the computation thread 355. It should be noted that although only two of the data transfer threads 155 and only five of the computation threads 355 are depicted and discussed, these quantities were again selected merely to provide an example to enable understanding, and should not be taken as limiting.

As previously discussed, in response to the quantity of available data transfer threads 155 being greater than the quantity of computation threads 355 associated with the request to transfer data, the assignment component 572 within the distribution thread 555 may divide the quantity of computation threads 355 associated with the request by the quantity of available data transfer threads 155 to determine the quantity of computation threads 355 that each of the data transfer threads 155 should be assigned to exchange blocks 131 of data with. However, as recognizable to those skilled in the art, such a quantity derived through division may include a remainder quantity of computation threads 355 to exchange blocks 131 of data with, as well as a quotient quantity. The assignment component 572 within the distribution thread 555 may distribute that remainder quantity among the assignments given to each of the data transfer threads 155 in a manner that minimizes the differences in quantities of computation threads 355 that each of the data transfer threads 155 is assigned to exchange blocks 131 of data with. As a result, one or more of the data transfer threads are assigned to exchange blocks 131 of data with a quantity of the computation threads 355 equal to the quotient quantity, while a number of the data transfer threads 155 equal to the value of the remainder quantity are assigned to exchange blocks 131 of data with a quantity of the computation threads 355 equal to the quotient plus one.

As depicted in this example, such a division of the quantity of five computation threads 355 associated with the request to perform the transfers in this example by the quantity of two available data transfer threads 155 results in a quotient quantity of two such that each of the data transfer threads 155a and 155x may be assigned to exchange blocks 131 of data with at least two of the computation threads 355a-c and 355x-y. Further, a remainder quantity of one also results from that division such that one of the data transfer threads 155a and 155x may be additionally assigned to exchange bocks 131 of data with one more of the computation threads 355a-c and 355x-y. More specifically, and as depicted, the data transfer thread 155a is assigned to transfer blocks 131 of data to or from the computation threads 355a-c and the data transfer thread 155x is assigned to transfer blocks 131 of data to or from computation threads 355x-y. As a result, a relatively even distribution of transfers of blocks 131 of data is assigned to the data transfer threads 155a and 155x.

Following this depicted assignment of transfers of data among the data transfer threads 155a and 155x, the transfer routines 170 within each of the data transfer threads 155a and 155x may order the computation threads 355a-c and 355x-y, respectively, into cyclic orderings. The transfer routine 170 within the data transfer thread 155a may then transfer blocks 131 of data to or from the computation threads 355a-c in a round robin manner that follows the cyclic ordering of the computation threads 355a-c so as to distribute the occurrences of such transfers relatively evenly among the computation threads 355a-c. Stated differently, the transfer routine 170 within the data transfer thread 155a may exchange a block 131 of data with the transfer routine 370 within the computation thread 355a first, then with the transfer routine 370 within the computation thread 355b next, and then with the transfer routine 370 within the computation thread 355c before returning to exchanging another block 131 of data with transfer routine 370 within the computation thread 355a. The transfer routine 170 within the data transfer thread 155x may also transfer blocks 131 of data to or from the computation threads 355x-y in a similar round robin manner. As a result of the round robin manner of performance of transferring blocks 131 of data, instances the transfers of blocks 131 of data are performed in a manner that remains relatively evenly distributed among the computational threads 355a-c and 355x-y as these transfers are performed.

FIGS. 9A through 9E, together, depict another example of transferring multiple blocks 131 of data in which the quantity of available data transfer threads 155 is less than the quantity of computation threads 355 associated with a request. More specifically, in FIGS. 9A-E, one data transfer thread 155a executed within the data storage cluster 1100 is assigned to transfer ten blocks 131 of data from four computation threads 355a-d executed within the data processing cluster 1300 and into storage as part of the data set 130. Again, the data transfer thread 155a is an instance of the data transfer thread 155, and each of the computation threads 355a-d may be an instance of the computation thread 355. It should be noted that although only one of the data transfer threads 155 and only four of the computation threads 355 are depicted and discussed, these quantities were again selected merely to provide an example to enable understanding, and should not be taken as limiting.

Unlike FIG. 8, in which two blocks 131 were transferred to or from each of the five computation threads 355a-c and 355x-y depicted therein such that an equal quantity of blocks 131 are exchanged with each of those five computation threads, in FIGS. 9A-E, unequal amounts of blocks of data 131 are exchanged between the single data transfer thread 155a and each of the four computation threads 355a-d. Thus, while each of the data transfer threads 155a and 155x were able to employ a relatively simple form of round robin approach to transferring blocks 131 of data either to or from each of various ones of the of the five computation threads 335a-c and 355x-y in FIG. 8, such simple a simple form of a round robin approach may not work in FIGS. 9A-E for transferring blocks 131 of data from computation threads 355a-d where the blocks 131 of data are distributed unevenly among those computation threads, as depicted.

To address this in the example of FIGS. 9A-E, the transfer routine 170 within the data transfer thread 155a may recurringly modify the cyclic ordering of the computation threads 355a-d to remove ones of the computation threads 355a-d that no longer have blocks 131 of data to be transferred away therefrom. In support of such recurring modification of the cyclic ordering by the transfer routine 170, the transfer routines 370 of each of the computation threads 355a-d may provide indications to the transfer routine 170 of when each of their respective ones of the computation threads 355a-d no longer has blocks 131 of data to be so transferred. Thus, as the transfers of blocks 131 of data from the computation threads 355a-d progress, the cyclic order of these computation threads is repeatedly modified to reduce the number of these computation threads that are included until there is only one of these computation threads that still has block(s) 131 of data to be transferred, and then until none of these computation threads still has any block 131 of data to be transferred.

Figure 9A:
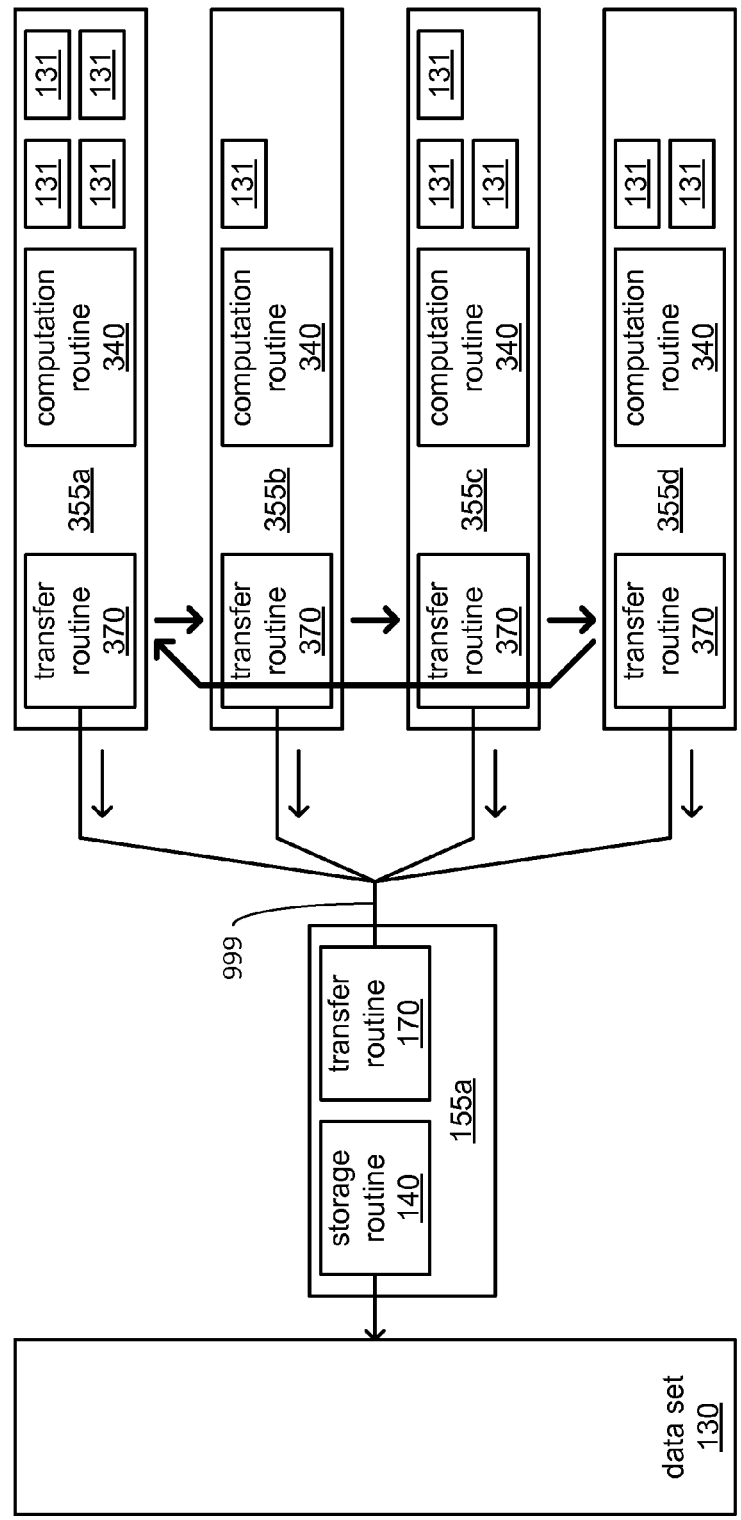
FIGS. 9A to 9E, together, each illustrate an example embodiment of transferring blocks from multiple computation threads by a single data transfer thread in analytical system.

FIGS. 9A through 9E are arranged in an order depicting a performance of the example data transfer from start to finish. Turning to FIG. 9A, the transfer routine 170 within the data transfer thread 155a may order the computation threads 955a-d into a cyclic ordering that may proceed from the computation thread 955a, to the computation thread 955b, to the computation thread 955c, to the computation thread 955d and back to the computation thread 955a.

Figure 9B:
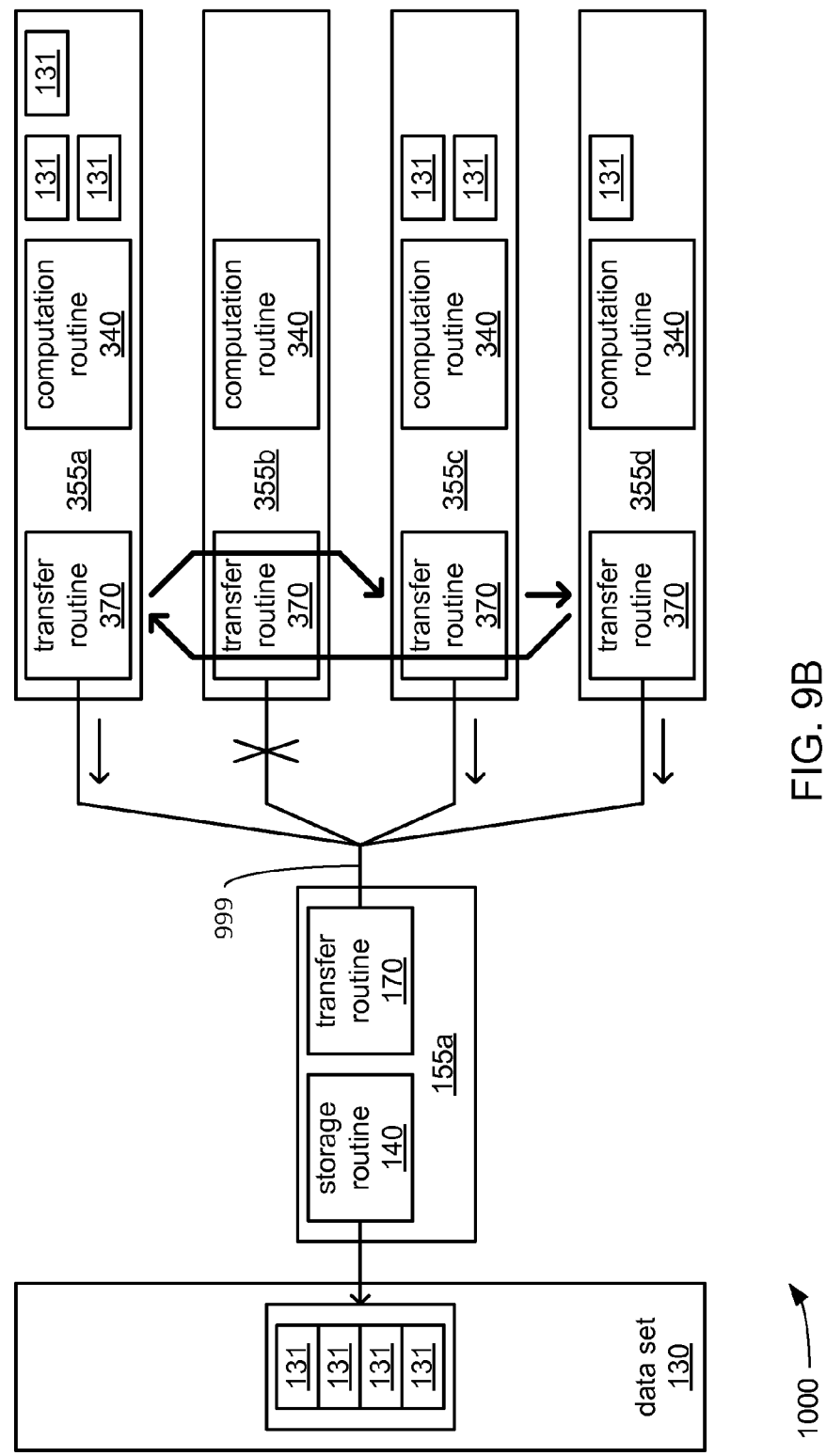

Turning to FIG. 9B, the transfer routine 170 within the data transfer thread 155a may have cooperated with the transfer routines 370 of each of the computation threads 355a, 355b, 355c and 355d in that order to transfer a block 131 of data from each to be stored by the storage routine 140 within the data transfer thread 155a as part of the data set 130. As depicted, as a result of such transferring of a single block 131 from each of the computation threads 355a-d, the computation thread 355b no longer has any blocks 131 of data left to be transferred away therefrom. In response, the transfer routine 370 within the computation thread 355b may signal the transfer routine 170 within the data transfer thread 155a of the fact that the computation thread 355b no longer has any blocks 131 of data to be so transferred. As a further response, the transfer routine 170 may alter the earlier generated cyclic ordering of the computation threads 355a-d to cease to include the computation thread 355b such that the cyclic ordering may proceed from the computation thread 955a, to the computation thread 955c, to the computation thread 955d and back to the computation thread 955a.

Figure 9C:
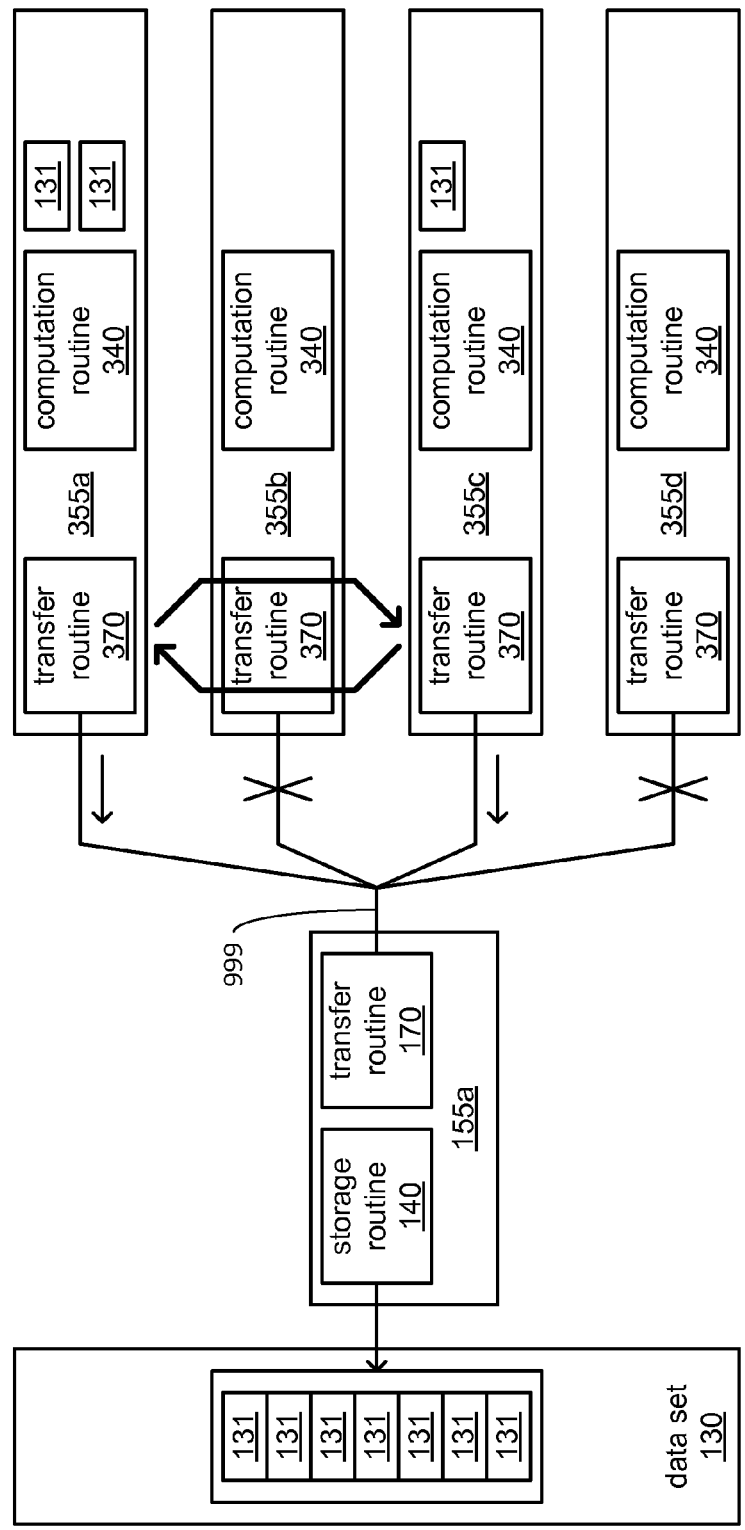

Turning to FIG. 9C, the transfer routine 170 within the data transfer thread 155a may have cooperated with the transfer routines 370 of each of the computation threads 355a, 355c and 355d in that order to transfer another block 131 of data from each to be stored by the storage routine 140 within the data transfer thread 155a as part of the data set 130. As depicted, as a result of such transferring of a single block 131 from each of the computation threads 355a and 355c-d, the computation thread 355d also no longer has any blocks 131 of data left to be transferred away therefrom. In response, the transfer routine 370 within the computation thread 355d may signal the transfer routine 170 within the data transfer thread 155a of the fact that the computation thread 355d no longer has any blocks 131 of data to be so transferred. As a further response, the transfer routine 170 may again alter the earlier generated cyclic ordering of the computation threads 355a-d to cease to include either of the computation threads 355b or 355d such that the cyclic ordering may proceed from the computation thread 955a, to the computation thread 955c and back to the computation thread 955a.

Figure 9D:
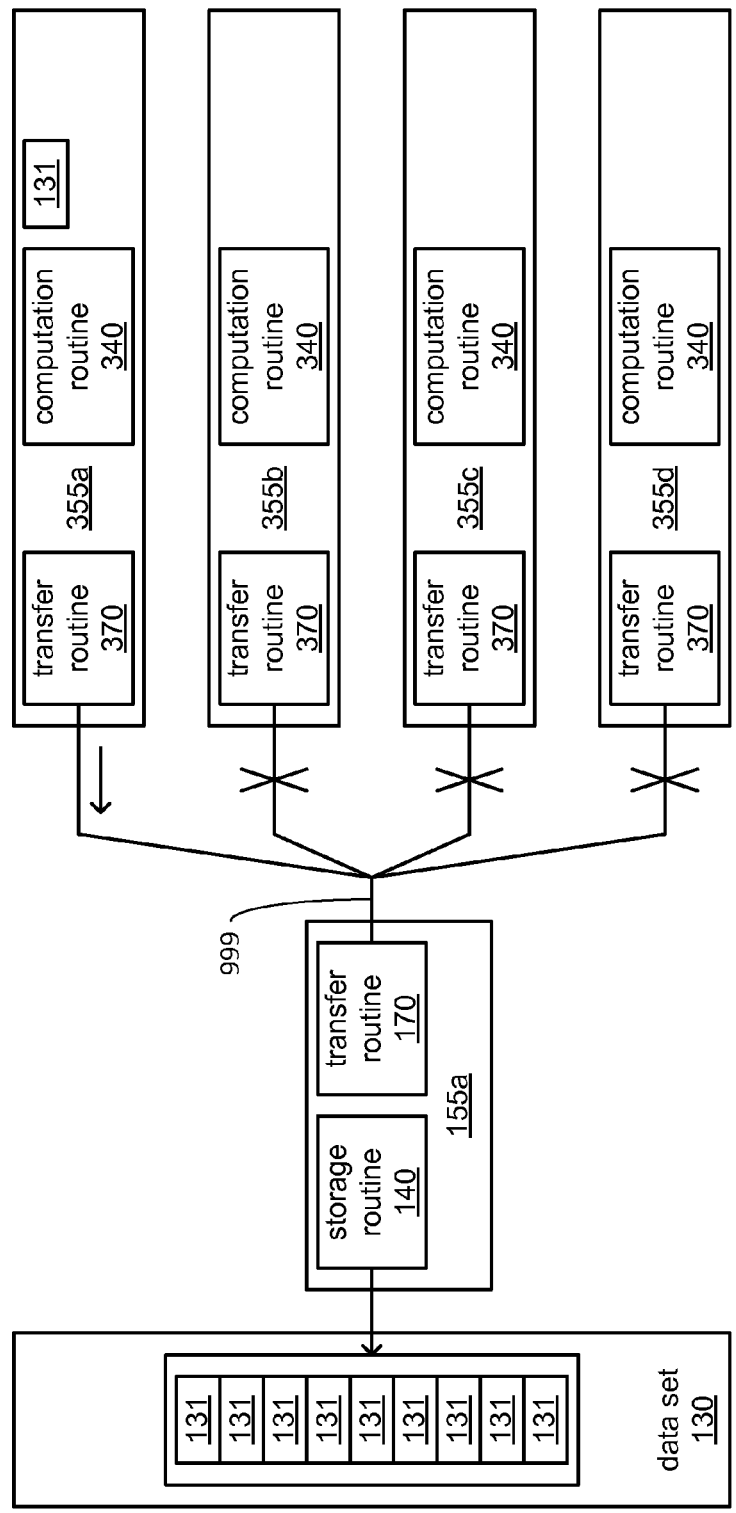

Turning to FIG. 9D, the transfer routine 170 within the data transfer thread 155a may have cooperated with the transfer routines 370 of each of the computation threads 355a and 355c in that order to transfer still another block 131 of data from each to be stored by the storage routine 140 within the data transfer thread 155a as part of the data set 130. As depicted, as a result of such transferring of a single block 131 from each of the computation threads 355a and 355c, the computation thread 355c now also no longer has any blocks 131 of data left to be transferred away therefrom. In response, the transfer routine 370 within the computation thread 355c may signal the transfer routine 170 within the data transfer thread 155a of the fact that the computation thread 355c no longer has any blocks 131 of data to be so transferred. As a further response, the transfer routine 170 may still again alter the earlier generated cyclic ordering of the computation threads 355a-d to cease to include any of the computation threads 355b-d such that the cyclic ordering may include only the computation thread 355a.

Figure 9E:
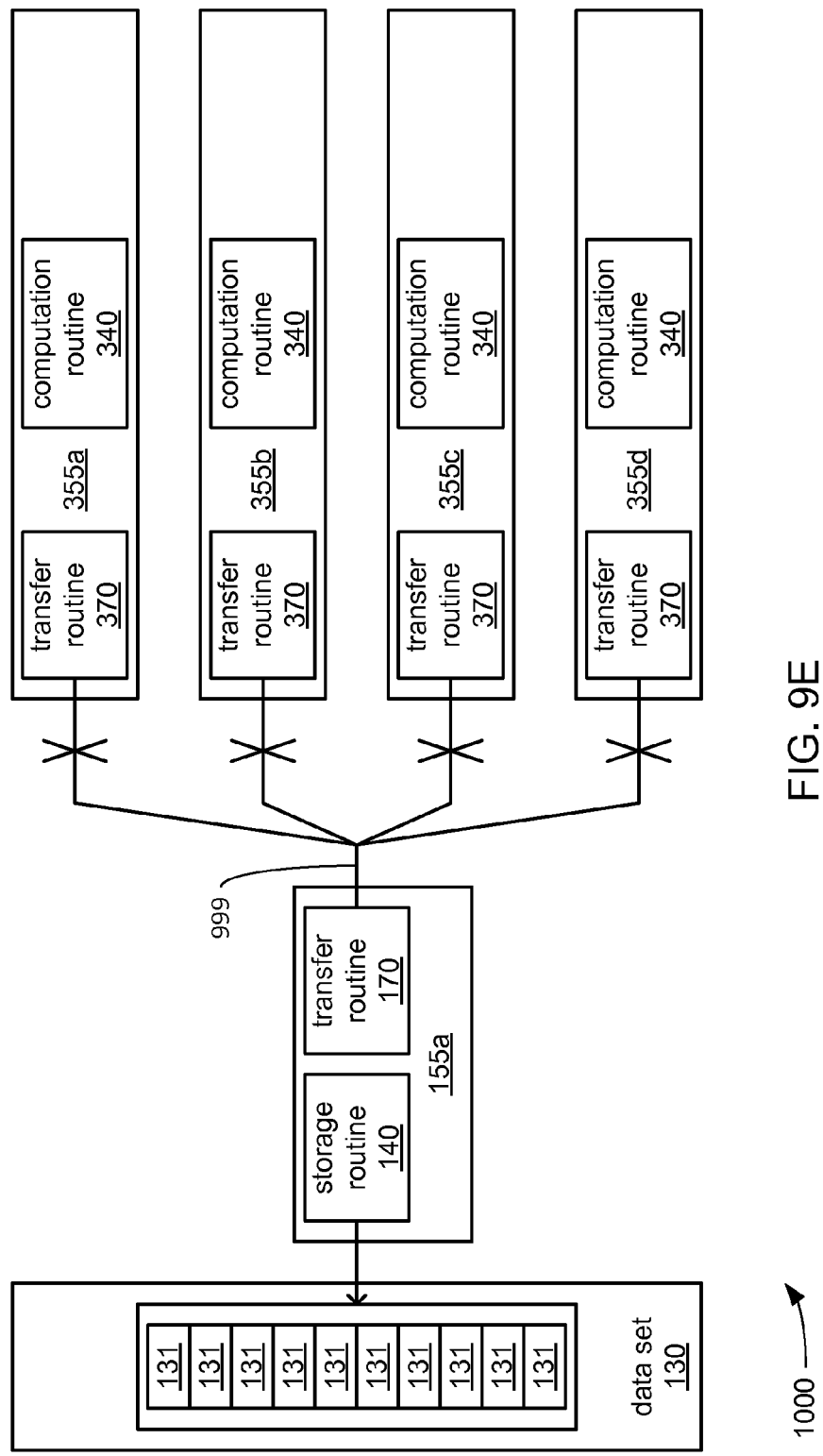

Turning to FIG. 9E, the transfer routine 170 within the data transfer thread 155a may have cooperated with the transfer routines 370 of the computation thread 355a to transfer still one more block 131 of data therefrom to be stored by the storage routine 140 within the data transfer thread 155a as part of the data set 130. As depicted, as a result of such transferring of a single block 131 from the computation thread 355a, the computation thread 355a now no longer has any blocks 131 of data left to be transferred away therefrom. In response, the transfer routine 370 within the computation thread 355a may signal the transfer routine 170 within the data transfer thread 155a of the fact that the computation thread 355a no longer has any blocks 131 of data to be so transferred. As a further response, the transfer routine 170 may cease performing any further transfers until the data transfer thread 155a is again assigned to perform a data transfer.

Returning to FIGS. 1 and 2, in various embodiments, each of the processor components 550, 650 and 750 may include any of a wide variety of commercially available processors. Further, one or more of these processor components may include multiple processors, a multi-threaded processor, a multi-core processor (whether the multiple cores coexist on the same or separate dies), and/or a multi-processor architecture of some other variety by which multiple physically separate processors are linked.

Although each of the processor components 550, 650 and 750 may include any of a variety of types of processor, it is envisioned that the processor component 650 of the graphics controller 600 of the embodiment of the computing device 500 of FIG. 2 may be somewhat specialized and/or optimized to perform tasks related to graphics, including graphics rendering. More broadly, it is envisioned that the graphics controller 600 serves as a graphics subsystem of the computing device 500 to enable the performance of tasks related at least to graphics rendering, using components separate and distinct from the processor component 550 and its more closely related components.

In various embodiments, each of the storages 560, 660 and 760 may be based on any of a wide variety of information storage technologies, including volatile technologies requiring the uninterrupted provision of electric power, and/or including technologies entailing the use of machine-readable storage media that may or may not be removable. Thus, each of these storages may include any of a wide variety of types (or combination of types) of storage component, including without limitation, read-only memory (ROM), random-access memory (RAM), dynamic RAM (DRAM), Double-Data-Rate DRAM (DDR-DRAM), synchronous DRAM (SDRAM), static RAM (SRAM), programmable ROM (PROM), erasable programmable ROM (EPROM), electrically erasable programmable ROM (EEPROM), flash memory, polymer memory (e.g., ferroelectric polymer memory), ovonic memory, phase change or ferroelectric memory, silicon-oxide-nitride-oxide-silicon (SONOS) memory, magnetic or optical cards, one or more individual ferromagnetic disk drives, or a plurality of storage components organized into one or more arrays (e.g., multiple ferromagnetic disk drives organized into a Redundant Array of Independent Disks array, or RAID array). It should be noted that although each of these storages is depicted as a single block, one or more of these may include multiple storage components that may be based on differing storage technologies. Thus, for example, one or more of each of these depicted storages may represent a combination of an optical drive or flash memory card reader by which programs and/or data may be stored and conveyed on some form of machine-readable storage media, a ferromagnetic disk drive to store programs and/or data locally for a relatively extended period, and one or more volatile solid state memory devices enabling relatively quick access to programs and/or data (e.g., SRAM or DRAM). It should also be noted that each of these storages may be made up of multiple storage components based on identical storage technology, but which may be maintained separately as a result of specialization in use (e.g., some DRAM devices employed as a main storage while other DRAM devices employed as a distinct frame buffer of a graphics controller).

In various embodiments, the interfaces 590 and 790 may employ any of a wide variety of communications technologies enabling these computing devices to be coupled to other devices as has been described. Each of these interfaces includes circuitry providing at least some of the requisite functionality to enable such coupling. However, each of these interfaces may also be at least partially implemented with sequences of instructions executed by corresponding ones of the processor components (e.g., to implement a protocol stack or other features). Where electrically and/or optically conductive cabling is employed, these interfaces may employ timings and/or protocols conforming to any of a variety of industry standards, including without limitation, RS-232C, RS-422, USB, Ethernet (IEEE-802.3) or IEEE-1394. Where the use of wireless transmissions is entailed, these interfaces may employ timings and/or protocols conforming to any of a variety of industry standards, including without limitation, IEEE 802.11a, 802.11b, 802.11g, 802.16, 802.20 (commonly referred to as "Mobile Broadband Wireless Access"); Bluetooth; ZigBee; or a cellular radiotelephone service such as GSM with General Packet Radio Service (GSM/GPRS), CDMA/1xRTT, Enhanced Data Rates for Global Evolution (EDGE), Evolution Data Only/Optimized (EV-DO), Evolution For Data and Voice (EV-DV), High Speed Downlink Packet Access (HSDPA), High Speed Uplink Packet Access (HSUPA), 4 G LTE, etc.

Figure 10A:
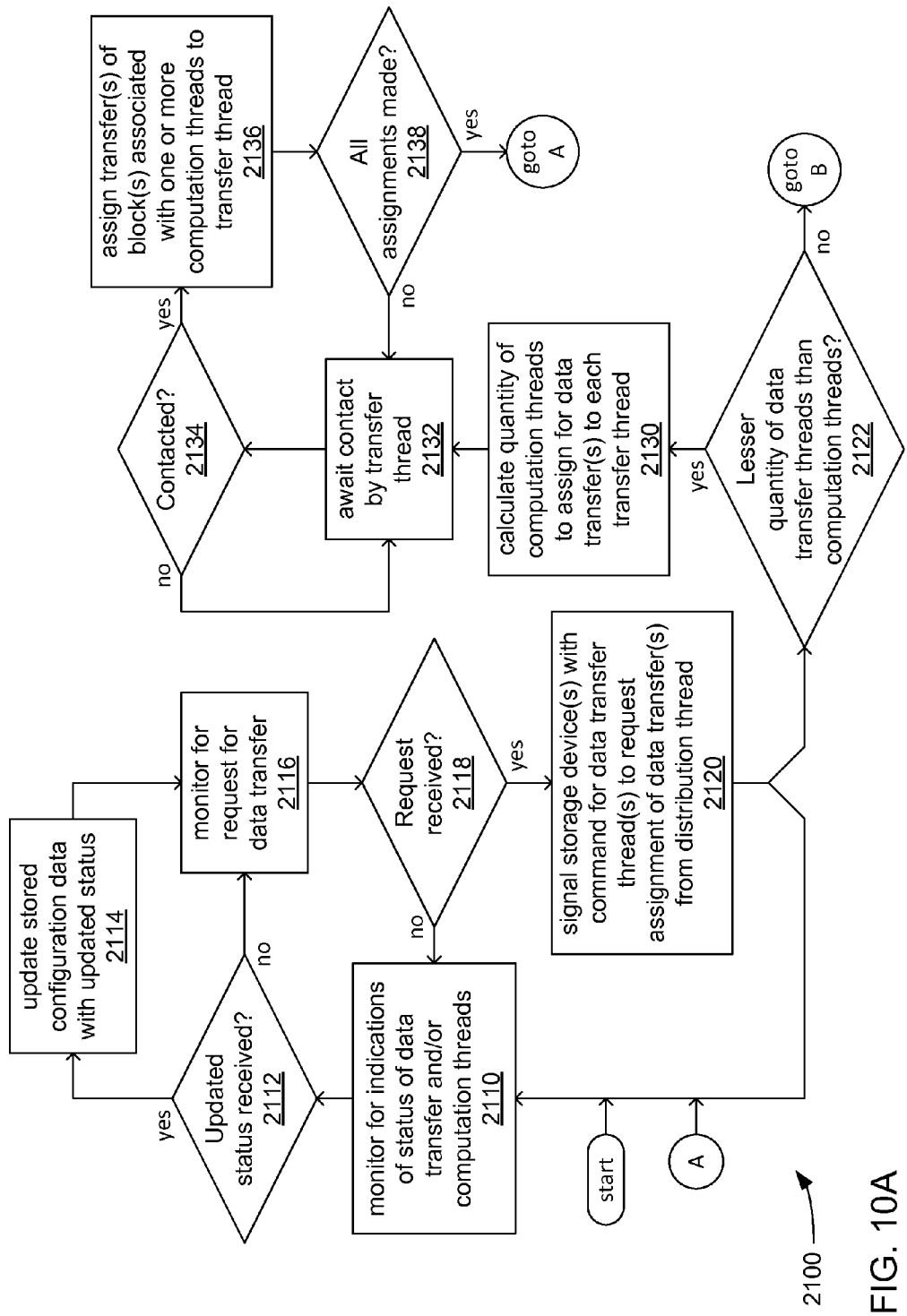
FIGS. 10A and 10B, together, illustrates an example embodiment of assigning transfers of blocks of data to data transfer threads in round robin order.
Figure 10B:
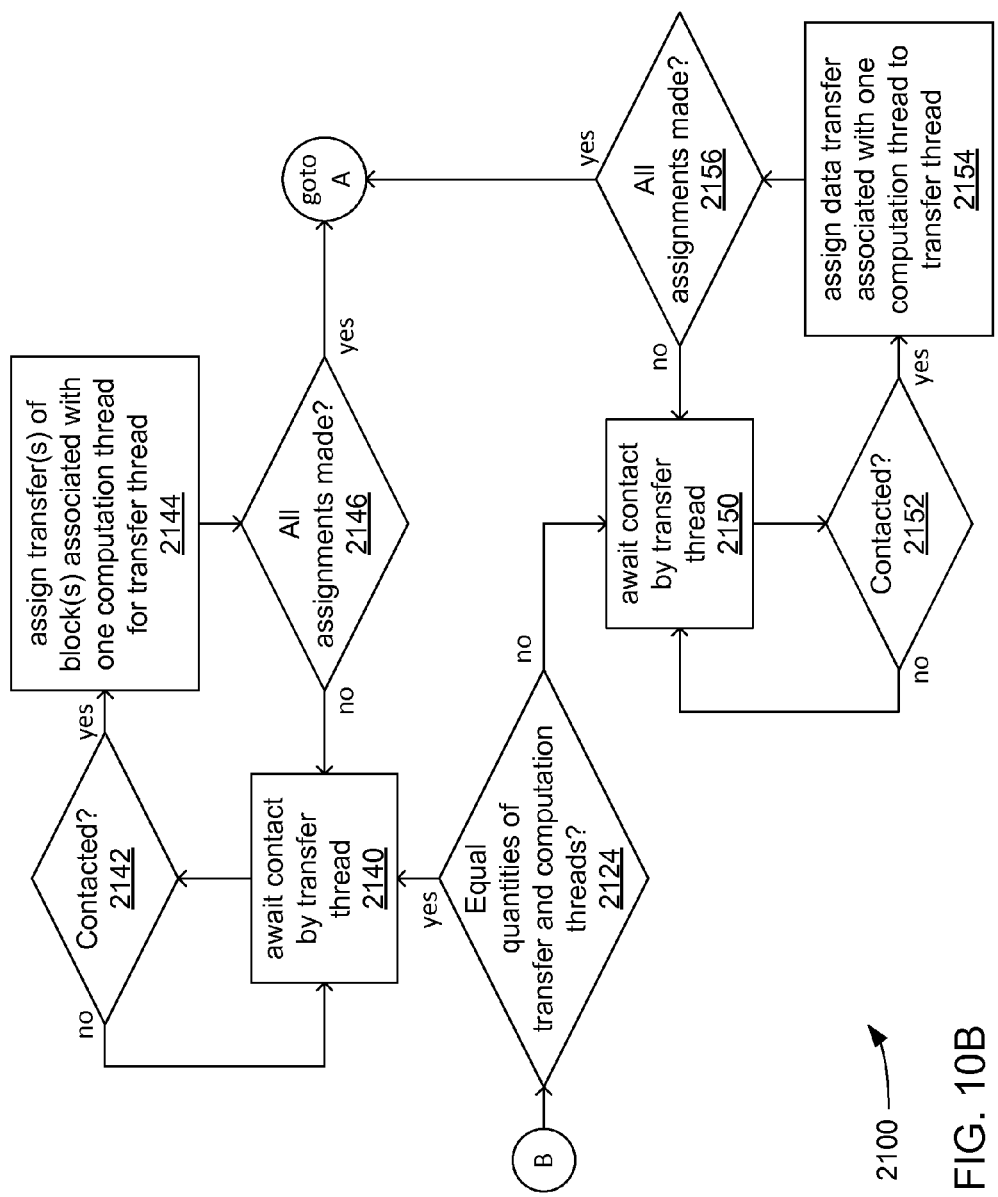

FIGS. 10A and 10B, together, illustrate an example embodiment of a logic flow 2100. The logic flow 2100 may be representative of some or all of the operations executed by one or more embodiments described herein. More specifically, the logic flow 2100 may illustrate operations performed by the processor component 350 of a computation device 300 or the processor component 550 of the coordinating device 500 in executing one or both of the control routine 540 and the distribution routine 570, and/or performed by other component(s) of at least a computation device 300 or the coordinating device 500 in coordinating performance of data transfers.

Turning to FIG. 10A, at 2110, a processor component of either a computation device of data processing cluster or a coordinating device (e.g., the processor component 350 of a computation device 300 of the data processing cluster 1300, or the processor component 550 of the coordinating device 500) may monitor for indications of changes in status of computation threads executed by one or more computation devices of a data processing cluster (e.g., the computation threads 355) and/or data transfer threads executed by one or more storage devices of a data storage cluster (e.g., the data transfer threads 155). As has been discussed, computation threads may or may not be engaged in the performance of analysis computations such that the quantity of computation threads so engaged may change over time. As a result, the quantity of computation threads that may be associated with requests to perform data transfers may also change over time. As also previously discussed, the quantity of data transfer threads that are available to perform data transfers may also change over time. As also previously discussed, the status information recurringly received during such monitoring may include network addresses and/or network port numbers for at least the computation threads on a network that may couple the computation devices and the storage devices.

At 2112, if an update to the status of computation and/or data transfer threads is received, then configuration data that is maintained by that processor component may be updated to reflect the updated status at 2114. However, regardless of whether updated status is received, the processor component may monitor for a request for a data transfer to transfer blocks of data associated with a data set (e.g., blocks 131 of data associated with the data set 130) at 2116.

At 2118, if no such request for data transfer is received, then the processor component may return to monitoring for an update of the status of computation and/or data transfer threads at 2110. However, if such a request is received at 2118, then at 2120, the processor component may signal one or more of the storage devices of the data storage cluster via the network with a command for the available data transfer threads thereof to each individually contact a distribution thread (e.g., the distribution thread 555) to request an assignment to transfer(s) of one or more blocks of data. As has been discussed, the command may include an indication of the network address on the network of the distribution thread.

At 2122, if there is a lesser quantity of available data transfer threads than of the computation threads associated with the data transfer request, then the quantity of computation threads to be associated with the transfer(s) of block(s) of data to be assigned to each data transfer thread may be calculated at 2130. As has been discussed, such a calculation may be a division of the quantity of computation threads associated with the data transfer request by the quantity of available data transfer threads to derive both quotient and remainder values. Each of the data transfer threads may be assigned to transfer block(s) of data associated with a quantity of the computation threads equal to the quotient value. Further, if the remainder value is non-zero, then a number of the available data transfer threads equal to the remainder value may be additionally assigned to transfer block(s) of data associated with one more of the computation threads.

At 2132, the processor component, as part of executing the distribution thread, may await independent contacting by each of the available data processing threads. At 2134, if such contact has not yet occurred, then the processor component may continue awaiting such contact at 2132. However, if such contact from an available data processing thread has occurred at 2134, then the processing component may assign transfer(s) of block(s) of data associated with one or more of the computation threads associated with the request for data transfers at 2136. At 2138, if all of the assignments to all of the available data transfer threads have been made, then the processor component may return to monitoring for the status of data transfer threads and/or computation threads at 2110. However, if at 2138, not all of such assignments have yet been made, then the processor component may return to awaiting contact by another available data transfer thread at 2132.

Alternatively, at 2122, if there is not a lesser quantity of available data transfer threads than of the computation threads associated with the data transfer request, then a check is made at 2124 as to whether these two quantities of threads are equal. If, at 2124, these two quantities of threads are equal, then as part of executing the distribution thread, the processor component may await independent contacting by each of the available data processing threads at 2140. At 2142, if such contact has not yet occurred, then the processor component may continue awaiting such contact at 2140. However, if such contact from an available data processing thread has occurred at 2142, then the processing component may assign transfer(s) of one or more block of data associated with a single one of the computation threads associated with the request for data transfers at 2144, thereby creating a one-to-one correspondence between each available data transfer thread and each computation thread associated with the request. At 2146, if all of the assignments to all of the available data transfer threads have been made, then the processor component may return to monitoring for the status of data transfer threads and/or computation threads at 2110. However, if at 2146, not all of such assignments have yet been made, then the processor component may return to awaiting contact by another available data transfer thread at 2140.

However, if at 2124, the quantity of available data transfer threads and the quantity of computation threads associated with the data transfer request are not equal, then as part of executing the distribution thread, the processor component may await independent contacting by each of the available data processing threads at 2150. At 2152, if such contact has not yet occurred, then the processor component may continue awaiting such contact at 2150. However, if such contact from an available data processing thread has occurred at 2152, then the processing component may assign a transfer of a block of data associated with a single one of the computation threads associated with the request for data transfers at 2154. At 2156, if all of the assignments to all of the available data transfer threads have been made, then the processor component may return to monitoring for the status of data transfer threads and/or computation threads at 2110. However, if at 2156, not all of such assignments have yet been made, then the processor component may return to awaiting contact by another available data transfer thread at 2150.

Figure 11:
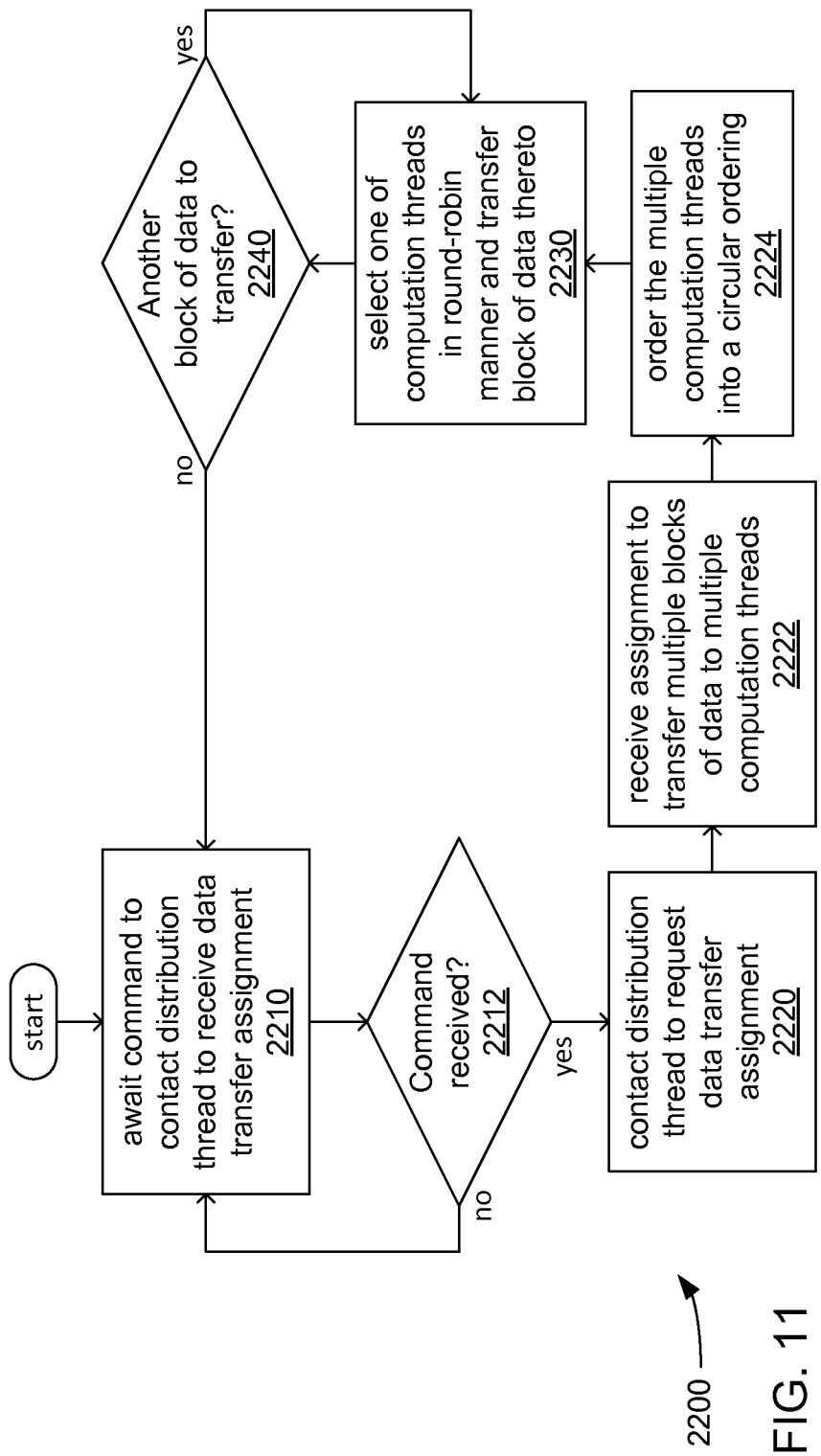
FIG. 11 illustrates an example embodiment of a logic flow of a single data transfer thread transferring multiple blocks of data to multiple computation threads.

FIG. 11 illustrates an example embodiment of a logic flow 2200. The logic flow 2200 may be representative of some or all of the operations executed by one or more embodiments described herein. More specifically, the logic flow 2200 may illustrate operations performed by the processor component 150 of a storage device 100 in executing a data transfer thread 155, and/or performed by other component(s) of at least a storage device 100 in performing data transfers.

At 2210, a processor component of a storage device of a data storage cluster (e.g., the processor component 150 of a storage 100 of the data storage cluster 1100) may, in executing a data transfer thread (e.g., a data transfer thread 155), await reception of a command to a distribution thread to be assigned transfer(s) of block(s) associated with one or more computation threads executed by one or more computation devices of a data processing cluster (e.g., the computation threads 355 executed by the computation device(s) 300 of the data processing cluster 1300). As has been explained, such a command may be generated and transmitted in response to another processing component receiving a request to perform data transfers to or from particular ones of the computation threads.

At 2212, if such a command has not yet occurred, then the processor component may continue awaiting such a command 2210. However, if such contact from an available data processing thread has occurred at 2212, then the processing component may do as directed in the command by contacting the distribution thread at 2220 as part of executing the data transfer thread to so request an assignment of one or more data transfers of one or more blocks of data for the data transfer thread.

At 2222, the processor component may receive an assignment from the distribution thread for the data transfer thread to transfer multiple blocks of data to multiple ones of the computation threads. In response to receiving an assignment to exchange blocks of data with multiple computation threads, the processor component may order the computation threads of the assignment into a cyclic ordering at 2224.

At 2230, as part of continuing to execute the data transfer thread, the processor component may perform a transfer of one of the blocks of data to one of the computation threads, each time selecting a computation thread to which to transfer a block of data in a round robin manner that follows the cyclic ordering. After each transfer of a block to a computation thread, the processor component may check at 2240 whether there is another block of data to so transfer. If so, then the processor component may perform another transfer at 2230. If not, then the processor component may return to awaiting reception of a command at 2210.

Figure 12:
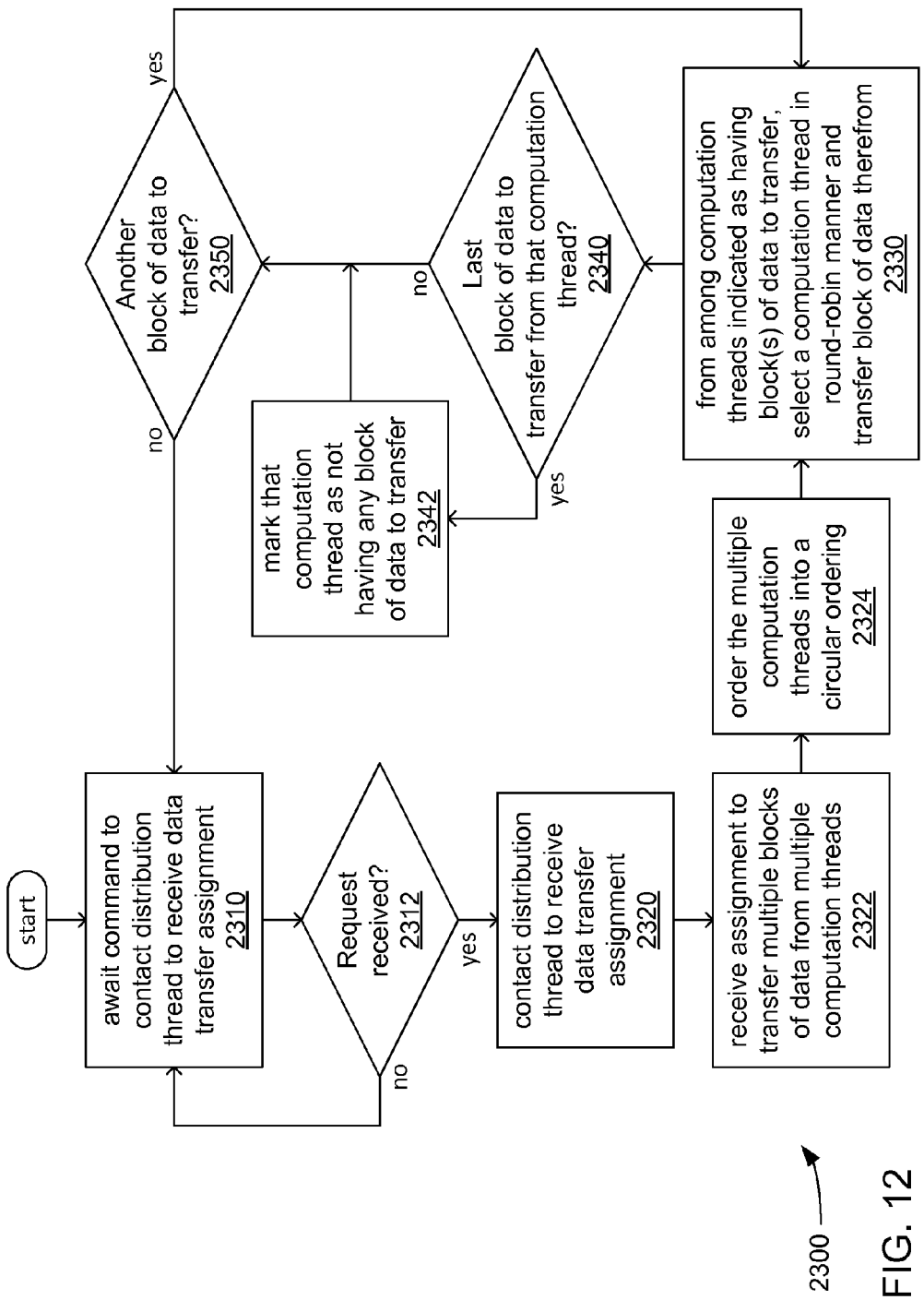
FIG. 12 illustrates an example embodiment of a logic flow of a single data transfer thread transferring multiple blocks of data from multiple computation threads.

FIG. 12 illustrates an example embodiment of a logic flow 2300. The logic flow 2300 may be representative of some or all of the operations executed by one or more embodiments described herein. More specifically, the logic flow 2300 may illustrate operations performed by the processor component 150 of a storage device 100 in executing a data transfer thread 155, and/or performed by other component(s) of at least a storage device 100 in performing data transfers.

At 2310, a processor component of a storage device of a data storage cluster (e.g., the processor component 150 of a storage 100 of the data storage cluster 1100) may, in executing a data transfer thread (e.g., a data transfer thread 155), await reception of a command to a distribution thread to be assigned transfer(s) of block(s) associated with one or more computation threads executed by one or more computation devices of a data processing cluster (e.g., the computation threads 355 executed by the computation device(s) 300 of the data processing cluster 1300). As has been explained, such a command may be generated and transmitted in response to another processing component receiving a request to perform data transfers to or from particular ones of the computation threads.

At 2312, if such a command has not yet occurred, then the processor component may continue awaiting such a command 2310. However, if such contact from an available data processing thread has occurred at 2312, then the processing component may do as directed in the command by contacting the distribution thread at 2320 as part of executing the data transfer thread to so request an assignment of one or more data transfers of one or more blocks of data for the data transfer thread.

At 2322, the processor component may receive an assignment from the distribution thread for the data transfer thread to transfer multiple blocks of data from multiple ones of the computation threads. In response to receiving an assignment to exchange blocks of data with multiple computation threads, the processor component may order the computation threads of the assignment into a cyclic ordering at 2324.

At 2330, as part of continuing to execute the data transfer thread, the processor component may select perform a transfer of one of the blocks of data from one of the computation threads, each time selecting a computation thread from which to transfer a block of data in a round robin manner that follows the cyclic ordering, but with the cyclic ordering limited to the ones of the computation threads that are indicated as still having at least one block of data to be transferred.

At 2340, if the block of data just transferred was the last block of data from that computation thread, then the processor component may mark that computation thread as having no more blocks of data to be transferred at 2342. In this way, the cyclic ordering of computation threads may be repeatedly modified as has been previously discussed to remove computation threads that no longer have blocks of data to be transferred.

Regardless of whether the block of data just transferred was the last block of data for that computation thread at 2340, the processor component makes a check at 2350 as to whether there remain any of the computation threads that still has a block of data to be transferred. If so, then the processor component may return to selecting a computation thread from which to transfer the next block of data and performing that transfer at 2330. If not, then the processor component may return to awaiting reception of a command at 2310.

Figure 13:
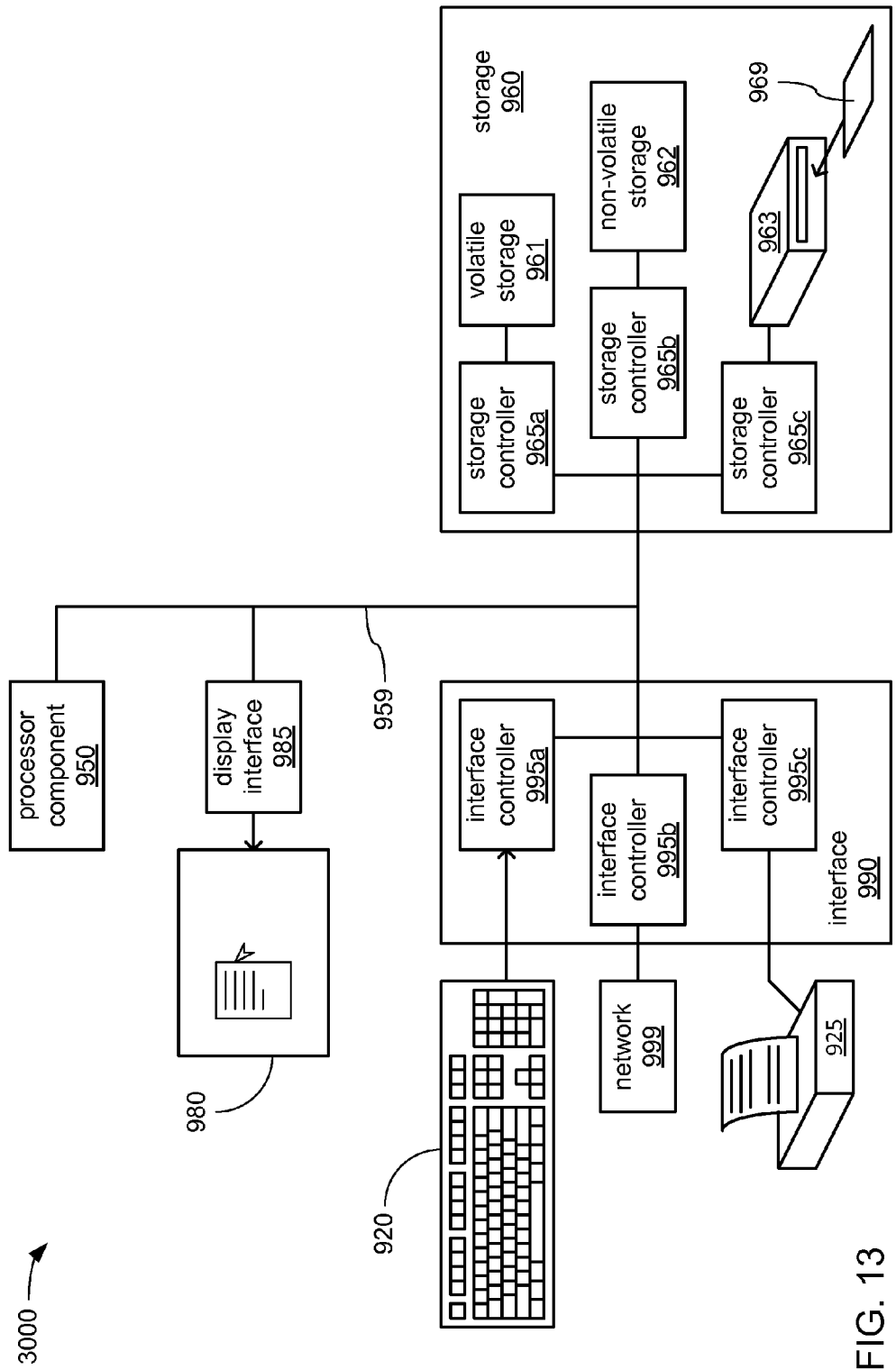
FIG. 13 illustrates an example embodiment of a processing architecture.

FIG. 13 illustrates an example embodiment of a processing architecture 3000 suitable for implementing various embodiments as previously described. More specifically, the processing architecture 3000 (or variants thereof) may be implemented as part of one or more of the computing devices 300, 500 or 700, or the controller 600. It should be noted that components of the processing architecture 3000 are given reference numbers in which the last two digits correspond to the last two digits of reference numbers of at least some of the components earlier depicted and described as part of the computing devices 300, 500 and 700, as well as the controller 600. This is done as an aid to correlating components of each.

The processing architecture 3000 includes various elements commonly employed in digital processing, including without limitation, one or more processors, multi-core processors, co-processors, memory units, chipsets, controllers, peripherals, interfaces, oscillators, timing devices, video cards, audio cards, multimedia input/output (I/O) components, power supplies, etc. As used in this application, the terms "system" and "component" are intended to refer to an entity of a computing device in which digital processing is carried out, that entity being hardware, a combination of hardware and software, software, or software in execution, examples of which are provided by this depicted exemplary processing architecture. For example, a component can be, but is not limited to being, a process running on a processor component, the processor component itself, a storage component (e.g., a hard disk drive, multiple storage drives in an array, etc.) that may employ an optical and/or magnetic storage medium, an software object, an executable sequence of instructions, a thread of execution, a program, and/or an entire computing device (e.g., an entire computer). By way of illustration, both an application running on a server and the server can be a component. One or more components can reside within a process and/or thread of execution, and a component can be localized on one computing device and/or distributed between two or more computing devices. Further, components may be communicatively coupled to each other by various types of communications media to coordinate operations. The coordination may involve the uni-directional or bi-directional exchange of information. For instance, the components may communicate information over the communications media. The information can be implemented as transmissions allocated to one or more electrical and/or optical conductors. A message (including a command, status, address or data message) may be one of such transmissions or may be a plurality of such transmissions, and may be transmitted either serially or substantially in parallel through any of a variety of connections and/or interfaces.

As depicted, in implementing the processing architecture 3000, a computing device includes at least a processor component 950, a storage 960, an interface 990 to other devices, and a coupling 959. As will be explained, depending on various aspects of a computing device implementing the processing architecture 3000, including its intended use and/or conditions of use, such a computing device may further include additional components, such as without limitation, a touch screen 980 incorporating a display interface 985.

The coupling 959 includes one or more buses, point-to-point interconnects, transceivers, buffers, crosspoint switches, and/or other conductors and/or logic that communicatively couples at least the processor component 950 to the storage 960. Coupling 959 may further couple the processor component 950 to one or more of the interface 990, the audio subsystem 970 and the display interface 985 (depending on which of these and/or other components are also present). With the processor component 950 being so coupled by couplings 955, the processor component 950 is able to perform the various ones of the tasks described at length, above, for whichever one(s) of the aforedescribed computing devices implement the processing architecture 3000. Coupling 959 may be implemented with any of a variety of technologies or combinations of technologies by which commands and/or data are optically and/or electrically conveyed. Further, at least portions of couplings 955 may employ timings and/or protocols conforming to any of a wide variety of industry standards, including without limitation, Accelerated Graphics Port (AGP), CardBus, Extended Industry Standard Architecture (E-ISA), Micro Channel Architecture (MCA), NuBus, Peripheral Component Interconnect (Extended) (PCI-X), PCI Express (PCI-E), Personal Computer Memory Card International Association (PCMCIA) bus, HyperTransport™, QuickPath, and the like.

As previously discussed, the processor component 950 (corresponding to the processor components 350 and 550) may include any of a wide variety of commercially available processors, employing any of a wide variety of technologies and implemented with one or more cores physically combined in any of a number of ways.

As previously discussed, the storage 960 (corresponding to the storages 360 and 560) may be made up of one or more distinct storage components based on any of a wide variety of technologies or combinations of technologies. More specifically, as depicted, the storage 960 may include one or more of a volatile storage 961 (e.g., solid state storage based on one or more forms of RAM technology), a non-volatile storage 962 (e.g., solid state, ferromagnetic or other storage not requiring a constant provision of electric power to preserve their contents), and a removable media storage 963 (e.g., removable disc or solid state memory card storage by which information may be conveyed between computing devices). This depiction of the storage 960 as including multiple distinct types of storage is in recognition of the commonplace use of more than one type of storage component in computing devices in which one type provides relatively rapid reading and writing capabilities enabling more rapid manipulation of data by the processor component 950 (but in which a "volatile" technology may be used constantly requiring electric power) while another type provides relatively high density of non-volatile storage (but likely provides relatively slow reading and writing capabilities).

Given the often different characteristics of different storage components employing different technologies, it is also commonplace for such different storage components to be coupled to other portions of a computing device through different storage controllers coupled to their differing storage components through different interfaces. By way of example, where the volatile storage 961 is present and is based on RAM technology, the volatile storage 961 may be communicatively coupled to coupling 959 through a storage controller 965*a* providing an appropriate interface to the volatile storage 961 that perhaps employs row and column addressing, and where the storage controller 965*a* may perform row refreshing and/or other maintenance tasks to aid in preserving information stored within the volatile storage 961. By way of another example, where the non-volatile storage 962 is present and includes one or more ferromagnetic and/or solid-state disk drives, the non-volatile storage 962 may be communicatively coupled to coupling 959 through a storage controller 965*b* providing an appropriate interface to the non-volatile storage 962 that perhaps employs addressing of blocks of information and/or of cylinders and sectors. By way of still another example, where the removable media storage 963 is present and includes one or more optical and/or solid-state disk drives employing one or more pieces of machine-readable storage medium 969, the removable media storage 963 may be communicatively coupled to coupling 959 through a storage controller 965*c* providing an appropriate interface to the removable media storage 963 that perhaps employs addressing of blocks of information, and where the storage controller 965*c* may coordinate read, erase and write operations in a manner specific to extending the lifespan of the machine-readable storage medium 969. The machine-readable storage medium 969, with executable instructions stored thereon, may be an example embodiment of a computer-program product that may or may not be fabricated in large quantities to enable distribution of those executable instructions.

One or the other of the volatile storage 961 or the non-volatile storage 962 may include an article of manufacture in the form of a machine-readable storage media on which a routine including a sequence of instructions executable by the processor component 950 may be stored, depending on the technologies on which each is based. By way of example, where the non-volatile storage 962 includes ferromagnetic-based disk drives (e.g., so-called "hard drives"), each such disk drive typically employs one or more rotating platters on which a coating of magnetically responsive particles is deposited and magnetically oriented in various patterns to store information, such as a sequence of instructions, in a manner akin to storage medium such as a floppy diskette. By way of another example, the non-volatile storage 962 may be made up of banks of solid-state storage components to store information, such as sequences of instructions, in a manner akin to a compact flash card. Again, it is commonplace to employ differing types of storage components in a computing device at different times to store executable routines and/or data. Thus, a routine including a sequence of instructions to be executed by the processor component 950 may initially be stored on the machine-readable storage medium 969, and the removable media storage 963 may be subsequently employed in copying that routine to the non-volatile storage 962 for longer term storage not requiring the continuing presence of the machine-readable storage medium 969 and/or the volatile storage 961 to enable more rapid access by the processor component 950 as that routine is executed.

As previously discussed, the interface 990 (which may correspond to the interfaces 590 or 790) may employ any of a variety of communications technologies corresponding to any of a variety of communications technologies that may be employed to communicatively couple a computing device to one or more other devices. Again, one or both of various forms of wired or wireless communications may be employed to enable the processor component 950 to interact with input/output devices (e.g., the depicted example keyboard 920 or printer 925) and/or other computing devices, where such interaction may be through a network (e.g., the network 999) or an interconnected set of networks. In recognition of the often greatly different character of multiple types of timings and/or protocols that must often be supported by any one computing device, the interface 990 is depicted as including multiple different interface controllers 995a, 995b and 995c. The interface controller 995a may employ any of a variety of types of wired digital serial interface or radio frequency wireless interface to receive serially transmitted messages from user input devices, such as the depicted keyboard 920. The interface controller 995b may employ any of a variety of cabling-based or wireless timings and/or protocols to access other computing devices through the depicted network 999 (perhaps a network made up of one or more links, smaller networks, or perhaps the Internet). The interface 995c may employ any of a variety of electrically conductive cabling enabling the use of either serial or parallel transmission to convey data to the depicted printer 925. Other examples of devices that may be communicatively coupled through one or more interface controllers of the interface 990 include, without limitation, microphones, remote controls, stylus pens, card readers, finger print readers, virtual reality interaction gloves, graphical input tablets, joysticks, other keyboards, retina scanners, the touch input component of touch screens, trackballs, various sensors, a camera or camera array to monitor movement of persons to accept commands and/or data provided by those persons via gestures and/or facial expressions, laser printers, inkjet printers, mechanical robots, milling machines, etc.

Where a computing device is communicatively coupled to (or perhaps, actually incorporates) a display (e.g., the depicted example display 980, corresponding to the display 780), such a computing device implementing the processing architecture 3000 may also include the display interface 985. Although more generalized types of interface may be employed in communicatively coupling to a display (whether of the touch screen variety, or not), the somewhat specialized additional processing often required in visually displaying various forms of content on a display, as well as the somewhat specialized nature of the cabling-based interfaces used, often makes the provision of a distinct display interface desirable. Wired and/or wireless communications technologies that may be employed by the display interface 985 in a communicative coupling of the touch screen 980 may make use of timings and/or protocols that conform to any of a variety of industry standards, including without limitation, any of a variety of analog video interfaces, Digital Video Interface (DVI), DisplayPort, etc.

Some systems may use Hadoop®, an open-source framework for storing and analyzing big data in a distributed computing environment. Some systems may use cloud computing, which can enable ubiquitous, convenient, on-demand network access to a shared pool of configurable computing resources (e.g., networks, servers, storage, applications and services) that can be rapidly provisioned and released with minimal management effort or service provider interaction. Some grid systems may be implemented as a multi-node Hadoop® cluster, as understood by a person of skill in the art. Apache™ Hadoop® is an open-source software framework for distributed computing. Some systems may use the SAS® LASR™ Analytic Server, which can deliver statistical modeling and machine learning capabilities in a highly interactive programming environment that enables multiple users to concurrently manage data, transform variables, perform exploratory analysis, build and compare models and score. Some systems may use SAS In-Memory Statistics for Hadoop® to read big data once and analyze it several times by persisting it in-memory for the entire session.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

The invention claimed is:

1. A computer-program product tangibly embodied in a non-transitory machine-readable storage medium, the computer-program product including instructions operable to cause a computing device to perform operations including:
    transmit, from a distribution thread, a command via a network to a data storage cluster for each data transfer thread of a multitude of data transfer threads executed within the data storage cluster to request assignment of a data transfer from the distribution thread at a network address specified in the command;
    await receipt of a request for assignment from a data transfer thread of the multitude of data transfer threads via the network;

compare a quantity of threads of the multitude of data transfer threads to a quantity of threads of a multitude of computation threads executed within a data processing cluster;

assign to the data transfer thread an exchange of a block of data with a single computation thread of the multitude of computation threads in response to receipt of the request for assignment and in response to the multitude of data transfer threads comprising a greater quantity of threads than the multitude of computation threads, the single computation thread to perform one or more computations on the block of data; and assign to the data transfer thread exchanges of multiple blocks of data with multiple computation threads of the multitude of computation in response to receipt of the request for assignment and in response to the multitude of data transfer threads comprising a lesser quantity of threads than the multitude of computation threads, wherein the multiple blocks of data comprises the block of data, the multiple computation threads to each perform one or more computations on one or more of the multiple blocks of data.

2. The computer-program product of claim 1, the computing device caused to:

receive from a storage device of the data storage cluster an indication of a quantity of data transfer threads that the multitude of data transfer threads comprises;

receive from a computation device of the data processing cluster an indication of a quantity of computation threads that the multitude of computation threads comprises; and divide the quantity of computation threads by the quantity of data transfer threads to determine a quantity of computation threads of the multitude of computation threads to assign to each data transfer thread of the multitude of data transfer threads to exchange data with in response to the multitude of computation threads comprising a greater quantity of threads than the multitude of data transfer threads.

3. The computer-program product of claim 2, the computing device caused to:

assign a number of computation threads of the multitude of computation threads equal to a quotient value derived by the division to each data transfer thread of the multitude of data transfer threads; and assign one additional computation thread of the multitude of computation threads to each of a number of the data transfer threads of the multitude of data transfer threads that equals a remainder value derived by the division.

4. The computer-program product of claim 1, the computing device caused to:

receive a network address of a computation thread of the multitude of computation threads via the network from a computation device of the data processing cluster; and provide the network address of the computation thread to the data transfer thread in response to receipt of the request for assignment to enable the data transfer thread to exchange data with the computation thread via the network.

5. The computer-program product of claim 4, the computing device caused to receive the network address of the computation thread in a request for an exchange of data between the data storage cluster and the data processing cluster.

6. The computer-program product of claim 1, the computing device caused to receive via the network a request for an exchange of data between the data storage cluster and the data processing cluster, the exchange comprising at least one of a transmission of a copy of multiple blocks of data stored by multiple storage devices of the data storage cluster to multiple computation devices of the data processing cluster via the network or a transmission of multiple blocks of data from the multiple computation devices of the data processing cluster to the multiple storage devices of the data storage cluster via the network for storage by the data storage cluster.

7. The computer-program product of claim 1, the computing device caused to, in response to the multitude of data transfer threads comprising a greater quantity of threads than the multitude of computation threads, assign the exchange of the block of data with the single computation thread in a round robin order of the multitude of computation threads to the data transfer thread based on the order in which the request for assignment from the data transfer thread is received relative to other requests for assignment received from other data transfer threads of the multitude of data transfer threads.

8. The computer-program product of claim 1, the computing device caused to receive a request for an exchange of data between the data storage cluster and the data processing cluster from a computation thread of a computation device of the data processing cluster, the exchange comprising the exchange of the block of data between a storage device of the data storage cluster in which the data transfer thread is executed and the computation device of the data processing cluster.

9. The computer-program product of claim 1, the computing device caused to:

generate, by circuitry, at least a portion of a visualization of results of a computation associated with the block of data that is performed by a computation thread; and transmit the at least a portion of the visualization to a viewing device via the network to enable presentation of the visualization on a display.

10. A computer-implemented method comprising:

transmitting, from a distribution thread, a command via a network to a data storage cluster for each data transfer thread of a multitude of data transfer threads executed within the data storage cluster to request assignment of a data transfer from the distribution thread at a network address specified in the command;

awaiting receipt of a request for assignment from a data transfer thread of the multitude of data transfer threads via the network;

comparing a quantity of threads of the multitude of data transfer threads to a quantity of threads of a multitude of computation threads executed within a data processing cluster; and assigning to the data transfer thread an exchange of a block of data with a single computation thread of the multitude of computation in response to receiving the request for assignment and in response to the multitude of data transfer threads comprising a greater quantity of threads than the multitude of computation threads, the single computation thread to perform one or more computations on the block of data, or assigning to the data transfer thread exchanges of multiple blocks of data with multiple computation threads of the multitude of computation threads in response to receiving the request for assignment and in response to the multitude of data transfer threads comprising a lesser quantity of threads than the multitude of computation threads, wherein the multiple blocks of data comprises the block of data, the multiple computation threads to each perform one or more computations on one or more of the multiple blocks of data.

11. The computer-implemented method of claim 10, comprising:
- receiving from a storage device of the data storage cluster an indication of a quantity of data transfer threads that the multitude of data transfer threads comprises;
- receiving from a computation device of the data processing cluster an indication of a quantity of computation threads that the multitude of computation threads comprises; and
- dividing the quantity of computation threads by the quantity of data transfer threads to determine a quantity of computation threads of the multitude of computation threads to assign to each data transfer thread of the multitude of data transfer threads to exchange data with in response to the multitude of computation threads comprising a greater quantity of threads than the multitude of data transfer threads.

12. The computer-implemented method of claim 11, comprising:
- assigning a number of computation threads of the multitude of computation threads equal to a quotient value derived by the division to each data transfer thread of the multitude of data transfer threads; and
- assigning one additional computation thread of the multitude of computation threads to each of a number of the data transfer threads of the multitude of data transfer threads that equals a remainder value derived by the division.

13. The computer-implemented method of claim 10, comprising:
- receiving a network address of a computation thread of the multitude of computation threads via the network from a computation device of the data processing cluster; and
- providing the network address of the computation thread to the data transfer thread in response to receiving the request for assignment to enable the data transfer thread to exchange data with the computation thread via the network.

14. The computer-implemented method of claim 13, comprising receiving the network address of the computation thread in a request for an exchange of data between the data storage cluster and the data processing cluster.

15. The computer-implemented method of claim 10, comprising receiving via the network a request for an exchange of data between the data storage cluster and the data processing cluster, the exchange comprising at least one of a transmission of a copy of multiple blocks of data stored by multiple storage devices of the data storage cluster to multiple computation devices of the data processing cluster via the network or a transmission of multiple blocks of data from the multiple computation devices of the data processing cluster to the multiple storage devices of the data storage cluster via the network for storage by the data storage cluster.

16. The computer-implemented method of claim 10, comprising, in response to the multitude of data transfer threads comprising a greater quantity of threads than the multitude of computation threads, assigning the exchange of the block of data with the single computation thread in a round robin order of the multitude of computation threads to the data transfer thread based on the order in which the request for assignment from the data transfer thread is received relative to other requests for assignment received from other data transfer threads of the multitude of data transfer threads.

17. The computer-implemented method of claim 10, comprising receiving a request for an exchange of data between the data storage cluster and the data processing cluster from a computation thread of a computation device of the data processing cluster, the exchange comprising the exchange of the block of data between a storage device of the data storage cluster in which the data transfer thread is executed and the computation device of the data processing cluster.

18. The computer-implemented method of claim 10, comprising:
- generating, by circuitry, at least a portion of a visualization of results of a computation associated with the block of data that is performed by a computation thread; and
- transmitting the at least a portion of the visualization to a viewing device via the network to enable presentation of the visualization on a display.

19. An apparatus comprising:
- a processor component;
- a command component for execution by the processor component in a distribution thread to transmit a command via a network to a data storage cluster for each data transfer thread of a multitude of data transfer threads executed within the data storage cluster to request assignment of a data transfer from an assignment component at a network address on the network specified in the command; and
- the assignment component for execution by the processor component in the distribution thread to:
- await receipt of a request for assignment from a data transfer thread of the multitude of data transfer threads via the network;
- compare a quantity of threads of the multitude of data transfer threads to a quantity of threads of a multitude of computation threads executed within a data processing cluster;
- assign to the data transfer thread an exchange of a block of data with a single computation thread of the multitude of computation in response to receipt of the request for assignment and in response to the multitude of data transfer threads comprising a greater quantity of threads than the multitude of computation threads, the single computation thread to perform one or more computations on the block of data; and
- assign to the data transfer thread exchanges of multiple blocks of data with multiple computation threads of the multitude of computation threads in response to receipt of the request for assignment and in response to the multitude of data transfer threads comprising a lesser quantity of threads than the multitude of computation threads, wherein the multiple blocks of data comprises the block of data, the multiple computation threads to each perform one or more computations on one or more of the multiple blocks of data.

20. The apparatus of claim 19, comprising a monitoring component to receive an indication of a quantity of data transfer threads that the multitude of data transfer threads comprises from a storage device of the data storage cluster and to receive an indication of a quantity of computation threads that the multitude of computation threads comprises from a computation device of the data processing cluster, wherein the command component divides the quantity of computation threads by the quantity of data transfer threads to determine a quantity of computation threads of the multitude of computation threads to assign to each data transfer thread of the multitude of data transfer threads to exchange data with in response to the multitude of computation threads comprising a greater quantity of threads than the multitude of data transfer threads.

21. The apparatus of claim 20, wherein the assignment component is to:

assign a number of computation threads of the multitude of computation threads equal to a quotient value derived by the division to each data transfer thread of the multitude of data transfer threads; and assign one additional computation thread of the multitude of computation threads to each of a number of the data transfer threads of the multitude of data transfer threads that equals a remainder value derived by the division.

22. The apparatus of claim 19, comprising a monitoring component to receive a network address of a computation thread of the multitude of computation threads via the network from a computation device of the data processing cluster, wherein the command component provides the network address of the computation thread to the data transfer thread in response to receipt of the request for assignment to enable the data transfer thread to exchange data with the computation thread via the network.

23. The apparatus of claim 19, comprising a request component to receive via the network a request for an exchange of data between the data storage cluster and the data processing cluster, the exchange comprising at least one of a transmission of a copy of multiple blocks of data stored by multiple storage devices of the data storage cluster to multiple computation devices of the data processing cluster via the network or a transmission of multiple blocks of data from the multiple computation devices of the data processing cluster to the multiple storage devices of the data storage cluster via the network for storage by the data storage cluster.

24. The apparatus of claim 23, wherein the request component receives network addresses for the multiple computation devices in the request for the exchange of data.

25. The apparatus of claim 24, wherein:
the processor component of the computation device is capable of processing analysis computations more quickly than another processor component of the storage device;
the computation device comprises a greater quantity of higher speed volatile storage than the storage device; and
the storage device comprises a greater capacity in slower speed non-volatile storage than the computation device.

26. The apparatus of claim 19, the assignment component to, in response to the multitude of data transfer threads comprising a greater quantity of threads than the multitude of computation threads, assign the exchange of the block of data with the single computation thread in a round robin order of the multitude of computation threads to the data transfer thread based on the order in which the request for assignment from the data transfer thread is received relative to other requests for assignment received from other data transfer threads of the multitude of data transfer threads.

27. The apparatus of claim 19, comprising a computation device of the data processing cluster, wherein:
the computation device comprises the processor component; and
the apparatus comprises a computation component for execution by the processor component within a computation thread of the multitude of computation threads.

28. The apparatus of claim 27, comprising a request component to receive a request for an exchange of data between the data storage cluster and the data processing cluster from the computation component, the exchange comprising the exchange of the block of data between a storage device of the data storage cluster in which the data transfer thread is executed and the computation device of the data processing cluster in which the computation component is executed by the processor component within the computation thread.

29. The apparatus of claim 27, wherein the computation component generates, by circuitry, at least a portion of a visualization of results of a computation associated with the block of data that is performed by the computation component, and transmits the at least a portion of the visualization to a viewing device via the network to present on a display.

* * * * *